(12) United States Patent
Benjamin

(10) Patent No.: US 11,937,576 B2
(45) Date of Patent: *Mar. 26, 2024

(54) INTERLINKING COLLAR COMPONENTS AND COLLAR DEVICES INCLUDING THE SAME

(71) Applicant: Nathanael Benjamin, Bothell, WA (US)

(72) Inventor: Nathanael Benjamin, Bothell, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/836,874

(22) Filed: Jun. 9, 2022

(65) Prior Publication Data

US 2022/0295748 A1 Sep. 22, 2022

Related U.S. Application Data

(60) Continuation of application No. 17/150,235, filed on Jan. 15, 2021, now Pat. No. 11,793,170, which is a
(Continued)

(51) Int. Cl.
*A01K 27/00* (2006.01)

(52) U.S. Cl.
CPC .................................. *A01K 27/001* (2013.01)

(58) Field of Classification Search
CPC .. A01K 27/001; A01K 27/005; A01K 27/002; A01K 15/02; A44B 11/266;
(Continued)

(56) References Cited

U.S. PATENT DOCUMENTS

| 205,515 A | 7/1878 | Von Culin |
| 441,706 A | 12/1890 | Schneider |

(Continued)

FOREIGN PATENT DOCUMENTS

| AT | 78722 B | 10/2019 |
| DE | 7026826 U | 10/1970 |

(Continued)

OTHER PUBLICATIONS

Herm Sprenger, "Extra Links for Dog Training Prong Collar to Extend Sizes Chrome Link 3 Ct Pack," downloaded from https://www.amazon.com/Herm-Sprenger-Prong-Collar-Extra/dp/B0002DIQDS/ref=pd_bxg on Jul. 1, 2017, 8 pages.
(Continued)

*Primary Examiner* — Trinh T Nguyen
(74) *Attorney, Agent, or Firm* — Seed IP Law Group LLP

(57) ABSTRACT

Collar devices including interlinking collar components that have a hollow portion and a securing portion connected by a flexible portion have increased strength and security. The number of collar components included in a collar device may be adjusted in order to properly fit a collar to a particular animal. Such collar devices generally include a plurality of interlinking collar components, as well as first and second loop attachment components, which couple to respective ends of interlinked collar components. A loop with a fastening element is then inserted into openings of the first and second loop attachment components.

20 Claims, 19 Drawing Sheets

Related U.S. Application Data division of application No. 16/101,355, filed on Aug. 10, 2018, now Pat. No. 11,129,366.

(60) Provisional application No. 62/544,513, filed on Aug. 11, 2017.

(58) Field of Classification Search
CPC ............ A44B 11/2592; A44B 11/2546; A44B 11/006; A44B 11/20
See application file for complete search history.

(56) References Cited

U.S. PATENT DOCUMENTS

| | | | |
|---|---|---|---|
| 485,630 | A | 11/1892 | Hull |
| 770,070 | A | 9/1904 | Johnson |
| 1,170,767 | A | 2/1916 | Lott |
| 2,394,144 | A | 12/1944 | Brose |
| 2,614,533 | A | 10/1952 | Elsinger |
| 2,616,394 | A | 11/1952 | Elsinger |
| 2,743,702 | A | 5/1956 | Sullivan |
| 2,859,732 | A | 11/1958 | Driscoll |
| 3,817,218 | A | 6/1974 | Bongiovanni |
| 3,872,833 | A | 3/1975 | Herbert |
| 3,995,598 | A | 12/1976 | Gardner et al. |
| 4,841,915 | A | 6/1989 | Rocchetti |
| 4,924,815 | A | 5/1990 | Halla |
| 4,940,020 | A | 7/1990 | Gordon |
| 4,996,948 | A | 3/1991 | Klein et al. |
| 5,647,303 | A | 7/1997 | Deioma |
| 6,606,967 | B1 | 8/2003 | Wolfe, Jr. et al. |
| 6,938,580 | B2 | 9/2005 | Herbst |
| 7,051,682 | B2 | 5/2006 | Clute et al. |
| 8,356,579 | B2 | 1/2013 | Sullivan |
| 8,919,295 | B2 | 12/2014 | Voellmecke et al. |
| 2004/0011300 | A1 | 1/2004 | Herbst |
| 2006/0277894 | A1 | 12/2006 | Lin |
| 2007/0226964 | A1 | 10/2007 | Woods |
| 2012/0067299 | A1 | 3/2012 | Völlmecke et al. |
| 2015/0150341 | A1 | 6/2015 | Singh |
| 2016/0374436 | A1* | 12/2016 | Park ............... A44B 11/266 24/615 |

FOREIGN PATENT DOCUMENTS

| | | |
|---|---|---|
| DE | 94 02 669.6 U1 | 4/1994 |
| DE | 296 08 325 U1 | 8/1996 |
| DE | 196 23 010 C1 | 6/1997 |
| DE | 298 08 808 U1 | 8/1998 |
| DE | 201 02 525 U1 | 6/2001 |
| DE | 10 2014 102 874 A1 | 11/2014 |
| GB | 831822 A | 3/1960 |
| GB | 838093 A | 6/1960 |
| WO | 2010/130501 A1 | 3/2010 |

OTHER PUBLICATIONS

"Pinch Dog Collar with Quick Release Snap Hook and Swivel," downloaded from https://www.original-herm-sprenger-dog-collars.com/training-dog-collars-c-37/pinch-dog-collar-with-quick-release-snap-hook-and-swivel-p-486.html on Jul. 1, 2017, 3 pages.
LeashesByDesign, "Buckle Adapter for Prong Collar," downloaded from https://www.etsy.com/listing/292638715/buckle-adapter-for-prong-collar?&utm_source=go on Jul. 1, 2017, 4 pages.
Petsafe, "PetSafe Petite Martingale Collar," downloaded from https://www.amazon.com/PetSafe-Martingale-Collar-Medium-Red/dp/B000JDIPUW on Jul. 1, 2017, 8 pages.
"Sea to Summit 2-Pin Side-Release Field Repair Buckle," downloaded from https://www.rei.com/product/850233/sea-to-summit-2-pin-side-release-field-repair-buckle on Jul. 10, 2017, 5 pages.
Sea to Summit, "Sea to Summit Field Repair Buckle," downloaded from https://smile.amazon.com/Sea-Summit-Field-Repair-Buckle/dp/B00BTO3H42/ref=sr_1_1?ie=UTF8&qid=1527800914&sr=8-1&keywords=sea+to+summit+field+repair+buckle+-+side+release+1+pin+1%22+%2F+25mm on May 31, 2018, 8 pages.
Starmark, "StarMark Add-A-Link," downloaded from https://www.amazon.com/StarMark-TCLL-Add-A-Link-Large/dp/B000A6HYY4/ref=pd_b on Jul. 1, 2017, 7 pages.
Starmark, "StarMark Training Collar, Large, Black," downloaded from https://www.amazon.com/StarMark-Training-Collar-Large-Black/dp/B000A6BD5K/ref=sr_ on Jul. 1, 2017, 6 pages.
"Don Sullivan Perfect Dog Command Collar with Extra Links and DVD," downloaded from https://www.newegg.com/Product/Product.aspx?Item-02W-0099-00028 on Jul. 1, 2017, 2 pages.
Wikipedia, "Martingale (collar)," downloaded from https://en.wikipedia.org/wiki/Martingale (collar) on Jul. 1, 2017, 1 page.
Star Mark. "Star Mark Pro-Training Dog Collar, Large—21": Amazon.co.uk: Business, Industry & Science, <https://www.amazon.co.uk/Star-Mark-Pro-Training-Collar-Large/dp/B002DVTHJY/ref=> Aug. 5, 2016 [retrieved Jul. 1, 2020], 3 pages.

* cited by examiner

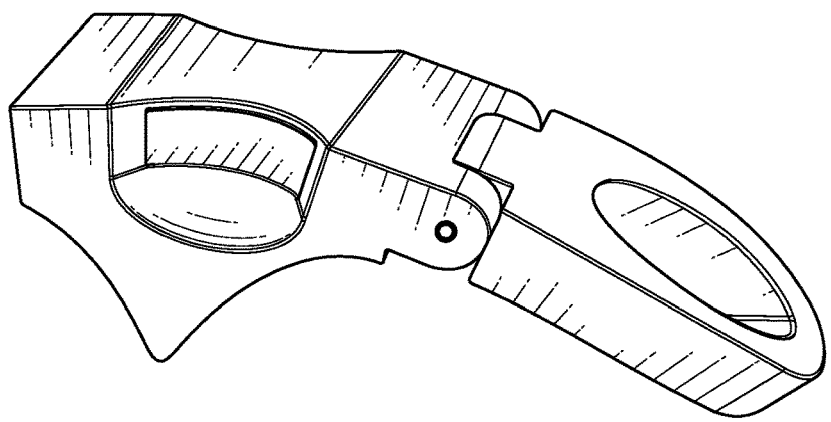
FIG. 3E
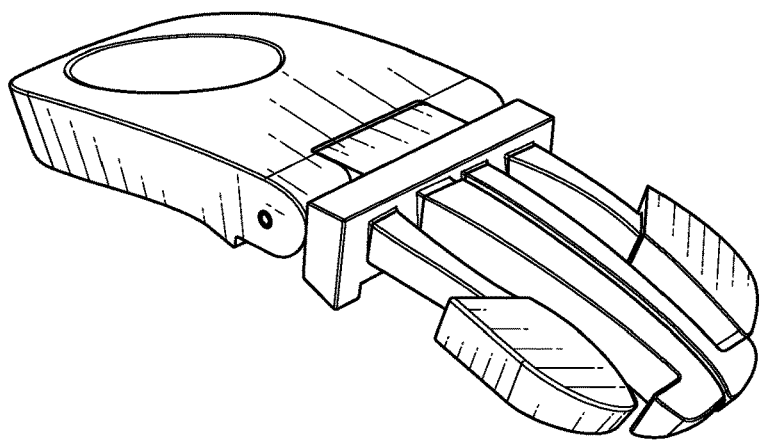
FIG. 3F
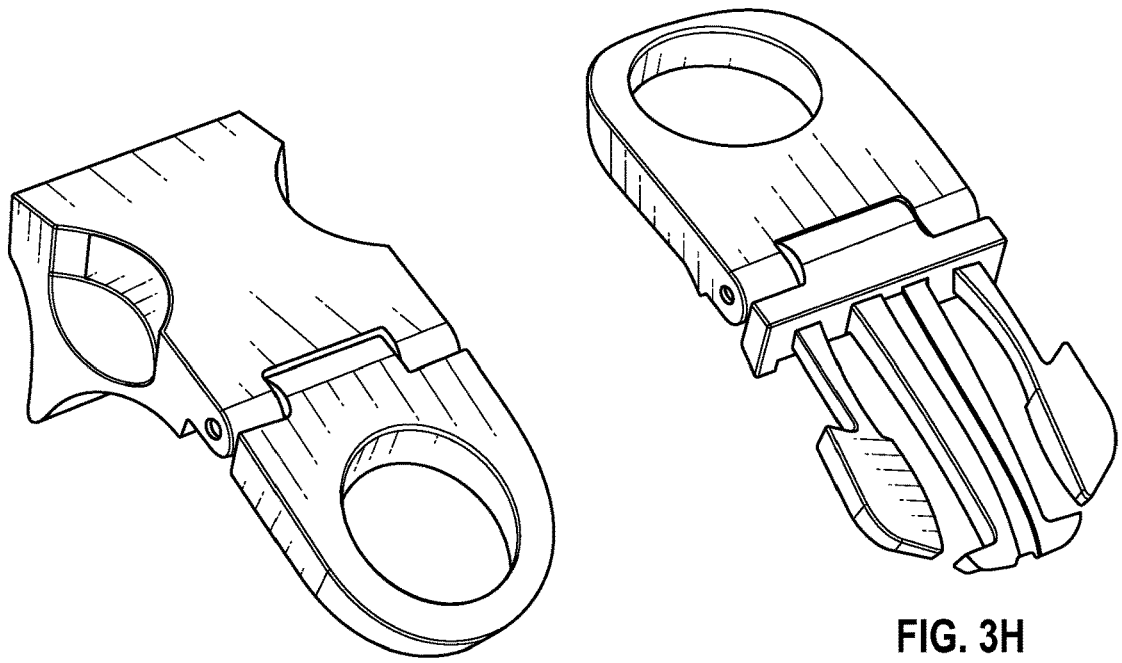
FIG. 3G
FIG. 3H

INTERLINKING COLLAR COMPONENTS AND COLLAR DEVICES INCLUDING THE SAME

BACKGROUND

Humans have used collars in one form or another in an attempt to assert control on various animals. The simplest collars are a strap or length of rope that can be attached to a lead, which allows an animal to be picketed (i.e., tethered to an immovable object, such as a stake). A collar and lead give a leader some control when leading an animal on walks and offer a means to train. Such collars may require that the leader supply enough mass and strength to act as a substitute for the immovable object that the lead is attached to when the animal is picketed in order to control the animal being led. Animals such as dogs can be difficult to lead because of their low center of gravity, increased traction, and increased power. By pulling on a lead, a traditional collar provides pressure on the front of an animal's throat, thereby reducing airflow and circulation.

Improvements to the simple collar have resulted in designs that are specialized for particular situations, such as for training. Training collars include, for example, the collapsing chain collar, which is essentially a section of chain with a ring on each end. In use, one ring is fed through the second ring and a lead attached. When a lead is attached to the first ring and pulled, the collar constricts the neck of the animal causing blood and air flow to be impeded. Such training collars may include prongs on the inner surface, which provide feedback that translates the force by which the lead is pulled. However, there is no practical limit on the force that can be supplied, and, in turn, translated into feedback to the animal. Accordingly, such collars can inflict permanent and serious damage to an animal when misused.

In order to prevent infliction of serious or permanent damage to an animal, further modifications, both in behavior and in the collar designs, have been made. For example, collars are removed when not training or on a walk, which raises additional issues. For example, many collars have to be opened completely to fit over an animal's head, resulting in a period where the animal is essentially unrestrained until the collar has been closed and fastened, which can require a high degree of dexterity and, in many cases, the use of two hands.

To accommodate users that do not have the dexterity required, or who do not wish to allow the animal be unrestrained (due to behavioral issues, etc.), collars have been produced that do not require the collar to be completely opened to be put on the animal. For example, a collar known as the 'Martingale collar' is made of a strap with both ends connected by a rope or chain loop with a ring onto which a lead is attached. The loop expands the collar to a size that allows it to be slipped over the animal's head. By pulling the lead, the loop is shortened, causing the collar to be resized. However, this type of system requires a collar that is large enough to fit over the animal's head, which also allows the animal to slip out of the collar if the loop is not shortened (e.g., if there is slack in the lead).

Accordingly, a need exists for an improved collar that is easy to put on an animal, does not leave the animal unrestrained for an unnecessarily long period of time, does not allow an animal to slip out of the collar due to the size, and does not risk causing serious or permanent damage.

BRIEF SUMMARY

The present disclosure is generally directed to collar devices including interlinking collar components that have a hollow portion and a securing portion connected by a flexible portion. The number of collar components may be adjusted in order to properly fit a collar to a particular animal. Such collar devices generally include a plurality of interlinking collar components, as well as first and second loop attachment components, which couple to respective ends of interlinked collar components. Additionally, a loop with a fastening element is threaded through the openings of the first and second loop attachment components. The fastening element may be larger than the openings of the first and second loop attachments, such that the collar device does not fully open. When the fastening element is unfastened, the collar can be expanded to a size that allows the collar to be placed over an animals head (i.e., the collar expands to a size that is greater than the skull size of the animal). Once the fastening element is fastened, the size of the collar may be reduced, such that the animal's skull size is larger than the circumference of the collar, preventing the collar from being removed unintentionally from the animal.

BRIEF DESCRIPTION OF THE DRAWINGS

The detailed description is described with reference to the accompanying figures. In the figures, the left-most digit(s) of a reference number identifies the figure in which the reference number appears. The same right-most digits of a reference number in different figures indicates similar or identical components or features.

The sizes and relative positions of elements in the figures are not necessarily drawn to scale. For example, the shapes of various elements and angles are not drawn to scale and some of these elements are enlarged and positioned to improve figure legibility. Further, the particular shapes of the elements as drawn, are not intended to convey any information regarding the actual shape of the particular elements, and have been solely selected for ease of recognition in the figures.

FIGS. 3A-3I show different views of embodiments of loop attachment components. FIGS. 3A and 3B each show a view a first loop attachment component. FIGS. 3C and 3D each show a view of a second loop attachment component.

DETAILED DESCRIPTION

The present disclosure is generally directed to devices including interlinking collar components that have a hollow portion and a securing portion connected by a flexible portion, as well as methods of making and using the same.

As described in detail below, such collar devices may be modular, which allows the addition or removal of collar components in order to properly fit the collar to the animal. By properly fitting the animal, the risk of the collar device being unintentionally removed from the animal, obstructing an animal's breathing or blood flow, or causing permanent damage to the animal is reduced. Additionally, the modular nature of the collar devices allows collar components to be selected for a specific animal. For example, collar components with angled protrusions may be selected for an animal with thin fur, or extensions may be added for animals with coarse, thick fur.

Further, a collar device may include a loop with a fastening element. The fastening element may be larger than the openings of the first and second loop attachments, such that the collar device does not fully open. When the fastening element is unfastened, the collar can be expanded to a size that allows the collar to be placed over an animals head (i.e., the collar expands to a size that is greater than the skull size of the animal). Once the fastening element is fastened, the size of the collar is be reduced, such that the animal's skull size may be larger than the circumference of the collar, preventing the collar from being removed unintentionally from the animal (e.g., if the loop is slack and the animal backs out). By allowing the loop to be resized with the fastening element, the collar devices may be used one handed.

In order to describe particular embodiments of the devices and methods of the disclosure, reference is made to the appended figures. This discussion should not be construed as limiting, as the particular details of the embodiments described herein are by way of example and are for purposes of illustrative discussion of embodiments of the present disclosure.

Figure 1A:
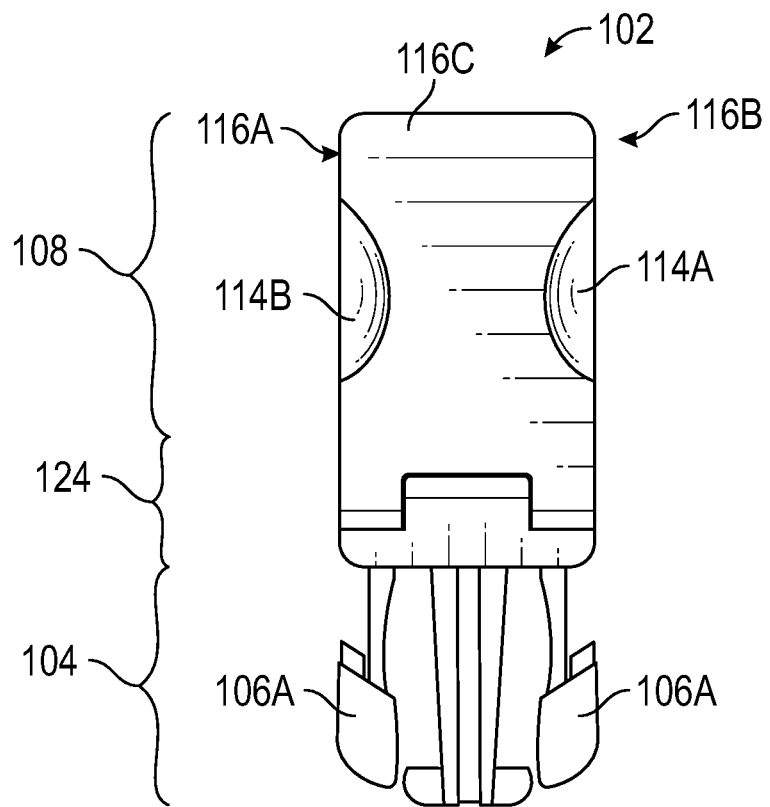
FIGS. 1A-1N show different views of embodiments of collar components of the disclosure.
Figure 1B:
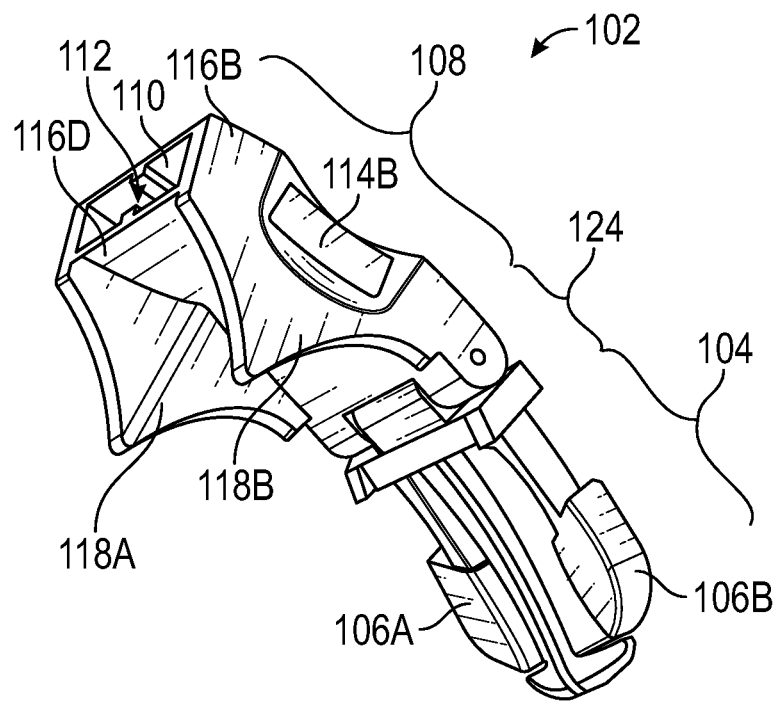

Collar devices of the present disclosure include at least one interlinking collar component or segment 102, as shown in FIGS. 1A and 1B. Collar components of the present disclosure may be formed of any suitable material.

At one end of a collar component 102 is a securing portion 104. A securing portion 104 generally includes one or more locking elements 106A, 106B. Locking elements may take any suitable form.

In embodiments, locking element(s) are in the form of one or more projections. In some embodiments, a locking element is a single projection. In such embodiments, a locking element may be a center release buckle, a twist lock buckle, a tuck lock buckle, a press lock buckle, a school bag buckle, or the like. In some embodiments, a projection is threaded. In further embodiments, a projection is a length of flexible material that can be doubled over, fed through an opening, and fastened (e.g., with a snap, a button, a clasp, etc.).

In other embodiments, locking elements 106A, 106B are matching projections on two sides of a securing portion 104. In such embodiments, the locking elements 106A, 106B may function as a portion of a side release buckle, as shown in FIGS. 1A and 1B.

At the opposite end of the collar component 102 is a hollow portion 108 with an opening 110 leading into an interior cavity 112. When multiple collar components are interlinked, a securing portion of a first collar component is inserted into a hollow portion of a second collar component. Accordingly, a hollow portion is generally shaped to receive a securing portion.

In some embodiments, a hollow portion of a particular collar component corresponds in shape and size to a securing portion of the same collar component. In other embodiments, a hollow portion of a particular collar component does not correspond in shape and size to a securing portion of the same collar component.

A hollow portion 108 may have one or more apertures or openings 114A, 114B. In embodiments, the one or more apertures 114A, 114B correspond to locking elements from a second collar element. For example, the one or more apertures 114A, 114B of the collar element shown in FIG. 1A may correspond to locking elements 106A and 106B of the collar element, such as those shown in FIG. 1B. In such embodiments, the one or more apertures 114A, 114B may be in a first surface 116A and second surface 116B.

In embodiments where one locking element is present, one corresponding aperture may be present. In such embodiments, the corresponding aperture may be in one of the exterior or interior surfaces 116C, 116D of a hollow portion 108.

In embodiments, an exterior or interior surface 116C, 116D is substantially planar. In some embodiments, an exterior or interior surface 116C, 116D of a hollow portion 108 is arched. In such embodiments, an exterior or interior surface 116C, 116D of a hollow portion 108 may have an angle raging from about 15° to about 45°. In some embodiments, an exterior or interior surface 116C, 116D of a hollow portion 108 has an angle raging from about 20° to about 40°. In further embodiments, an exterior or interior surface 116C, 116D of a hollow portion 108 may have an angle raging from about 25° to about 35°. In particular embodiments, an exterior or interior surface 116C, 116D of a hollow portion 108 has an angle of about 30°. Said differently, the hollow portion includes a surface 116D that is slightly curved, such that a middle section of this surface is not is the same plane as the end of the surface that is positioned at the opening 110.

In embodiments, an interior surface 116D of a hollow portion 108 has one or more protrusions 118A, 118B. A protrusion may be located in any suitable location on an interior surface 116D of a hollow portion 108. For example, a protrusion 118A, 118B may be located near either edge of an interior surface 116D, as shown in FIG. 1B. Similarly, a protrusion may be located near an aperture 114A, 114B. In other embodiments, a protrusion is located substantially in the center of an interior surface 116D. The protrusions extend from a side of the hollow portion away from the apertures 114A, 114B, where a wider portion of the protrusion is adjacent to the aperture and a narrower portion of the protrusion is spaced from the aperture. The narrower portion may be a curved tip or point. Each protrusion has a width that is transverse to the extension direction.

In some embodiments, a collar component may have one protrusion. In some embodiments, a collar component may have two or more protrusions. In further embodiments, a collar component may have three, four, five, six, or more protrusions.

Such protrusion(s) may be in any suitable shape, such as a substantially flat triangular protrusion, a substantially conical protrusion, a truncated substantially conical protrusion, a substantially pyramidal (e.g. square-based pyramid, triangle-based pyramid, etc.) protrusion, a truncated substantially conical protrusion, a T-shaped protrusion, an H-shaped protrusion, a U-shaped protrusion, and the like.

Additionally, a protrusion may be any suitable length and width. In some embodiments, the length and width of a protrusion is based on the type of animal on which the collar device will be used. In embodiments, the animal is a canine, and the length and width of a protrusion is chosen based on the breed, age, weight, overall health, and the like. In some embodiments, the length or thickness of a canine's fur may influence the length or width of protrusions used in order to account for the insulating effects of the canine's fur. For example, a collar to be used on a canine with longer or thicker fur may have longer or thinner protrusions than a collar to be used on a canine with little to no fur.

Figure 1C:
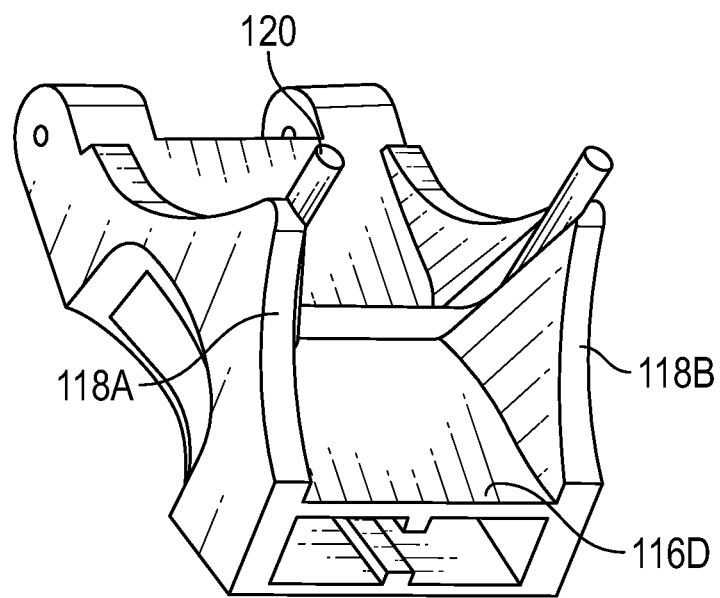
Figure 1D:
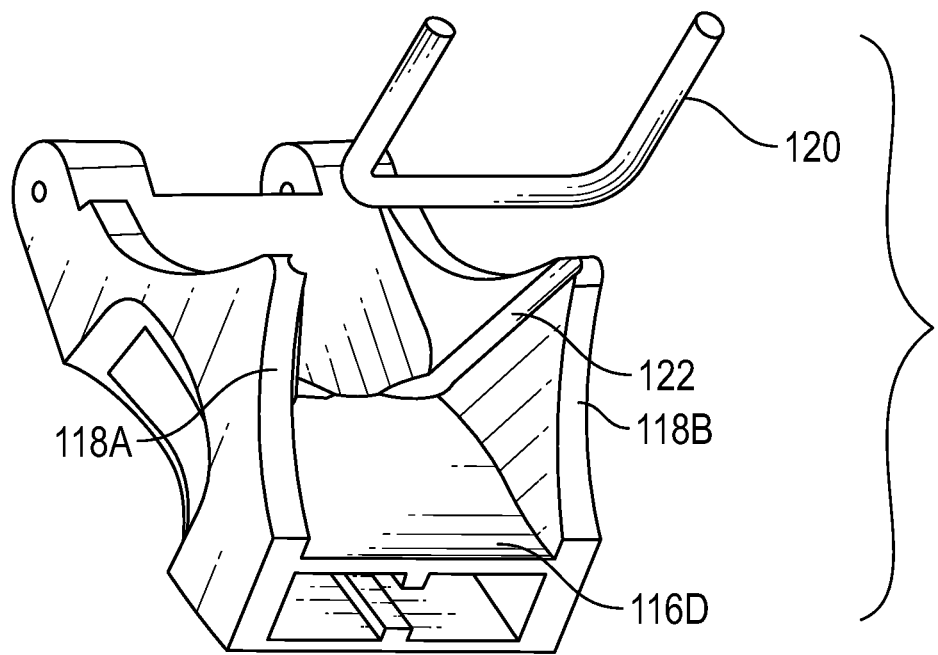

In embodiments, an extension 120 is present, as shown in FIG. 1C. Such an extension 120 may be used if an animal (e.g., a canine) that will wear the collar has particularly thick fur. In some embodiments, an extension 120 is coupled to an interior surface 116D, the one or more protrusions 118A, 118B, or both. In some embodiments, the extension 120 is removably coupled to interior surface 116D, the one or more protrusions 118A, 118B, or both. As shown in FIG. 1D, an extension 120 may be in the form of a substantially U-shaped bracket. Such an extension 120 may be situated in a similarly shaped track 122. In such embodiments, the extension 120 may be held in place by pressure exerted by the extension 120 against the sidewalls of protrusions 118A, 118B.

In some embodiments, a portion of a track 122 extends from the base to the tip of a protrusion 118B, as is illustrated in FIGS. 1C and 1D. In such embodiments, if protrusions 118A, 118B are angled, the corresponding track 122 may also be angled, so that a portion of a track 122 may extend from the base to the tip of a protrusion 118A, 118B. In further embodiments, multiple tracks 122 are present at a variety angles such that an extension 120 is positioned in any one of the tracks.

In embodiments, two or more extensions are present. Although an extension in the form of a substantially U-shaped bracket is shown, it is understood that extensions in any suitable shape (e.g., V-shaped, H-shaped, L-shaped, linear, etc.) may be used.

In some embodiments, a protrusion is angled. In some embodiments, a protrusion has an angle ranging from about 15° to about 135°, in relation to the surface 116D. In further embodiments, a protrusion has an angle ranging from about 15° to about 60°, from about 30° to about 75°, from about 45° to about 90°, from about 60° to about 105°, from about 75° to about 120°, from about 90° to about 135°, from about 105° to about 150°, or from about 120° to about 165°, in relation to surface 116D. By angling a protrusion, more surface area of the protrusion is engaged as the pressure is increased and the protrusion is pressed into the neck of an animal. Accordingly, as explained further below, as the pressure applied to the lead increases, the impact on the animal increases to a certain point and then plateaus. By distributing the increased pressure over a larger surface area, the risk of causing harm by the collar is reduced.

A hollow portion 108 and a securing portion 104 are joined by a flexible portion 124. As shown in FIG. 1A and FIG. 1B, a flexible portion 124 may be a hinge. Exploded views of portions of such a hinge are shown in FIG. 1C, FIG. 1D, and FIG. 1F. As can be seen in FIG. 1F, a pin 125

In other embodiments, a flexible portion 124 is an articulation, a swivel, or a bracket. In further embodiments, a flexible portion 124 is an area of material that is thinner or otherwise formed to allow for flexibility (e.g., corrugated, perforated, etc.). In still further embodiments, a flexible portion 124 is formed of a material that is more flexible than the hollow portion 108 or the securing portion 104.

In some embodiments, a hollow portion 108, a flexible portion 124, and a securing portion 104 are formed of a single contiguous element. In other embodiments, a hollow portion 108 and a securing portion 104 are formed of two elements. In some such embodiments, a flexible portion 124 joins the hollow portion 108 and the securing portion 104. In some embodiments, a flexible portion 124 and a hollow portion 108 are formed as a single element. In some embodiments, a flexible portion 124 and a securing portion 104 are formed as a single element.

Figure 1E:
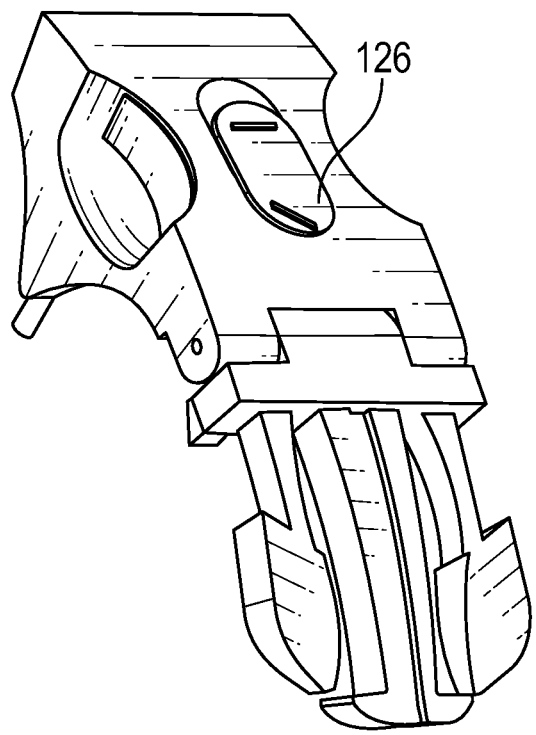
Figure 1F:
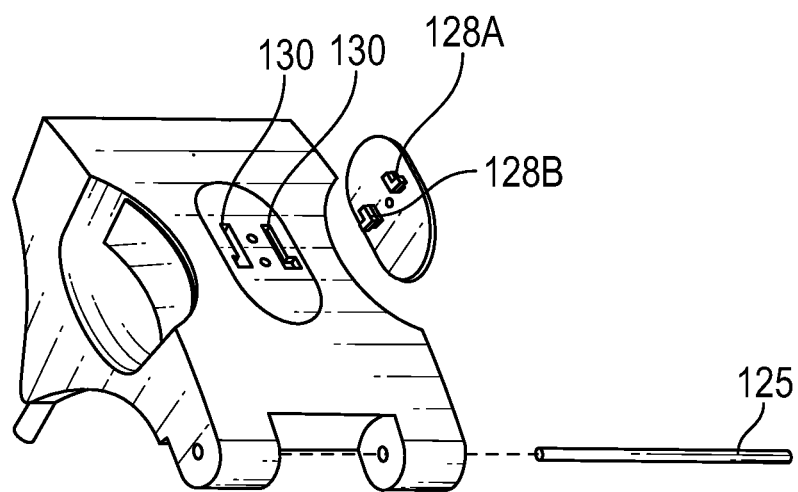

Additionally, in some embodiments, a locking mechanism 126 is present, as shown in FIG. 1E. Such a locking mechanism may be used to prevent two interlinked collar components from being decoupled. In some embodiments, it is possible to decouple two interlinked collar components while a locking mechanism is engaged, but the locking mechanism may hinder efforts to do so. Any suitable locking mechanism may be used. FIG. 1F shows another view of the locking mechanism 126 of FIG. 1E. As can be seen in FIG. 1F, locking mechanism 126 has two prongs 128A, 128B, which may be slid in a track 130 from a first "unlocked" position to a second "locked" position. In such embodiments, when two collar components are interlinked, as discussed further throughout the present application, a locking mechanism 126 may be in engaged (i.e., positioned in a second "locked" position), and prongs 128A, 128B Prongs 128A, 128B include extensions that are transvers to a main portion of the prong. These extensions fit into a wider portion of the track 130. The locking mechanism slides along the track to the winder portion to engage and prevent locking elements 106A, 106B (e.g., shown in FIG. 1A) from being pushed toward one another. In other words, in the "locked" position, the extensions of the prongs are positioned adjacent to the locking elements such that the locking elements press against the extensions of the prongs when pressed toward each other. This may prevent or hinder the decoupling of two collar elements.

Figure 1G:
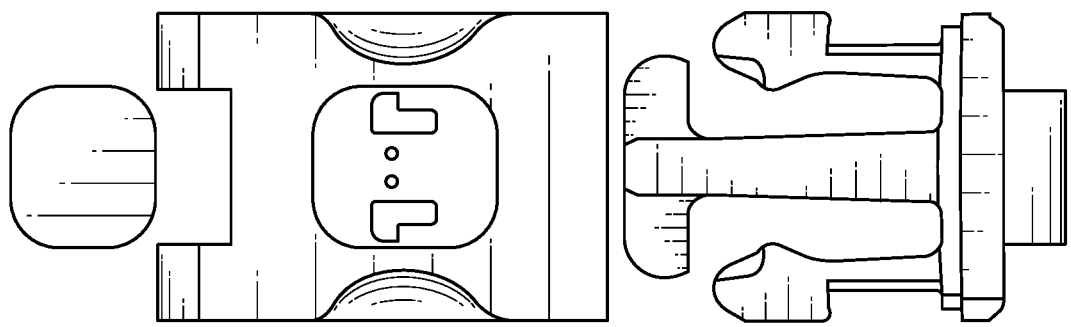
Figure 1H:
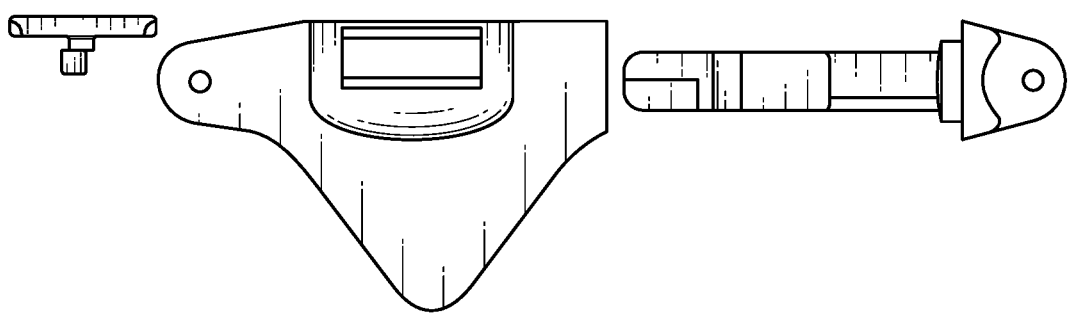
Figure 1I:
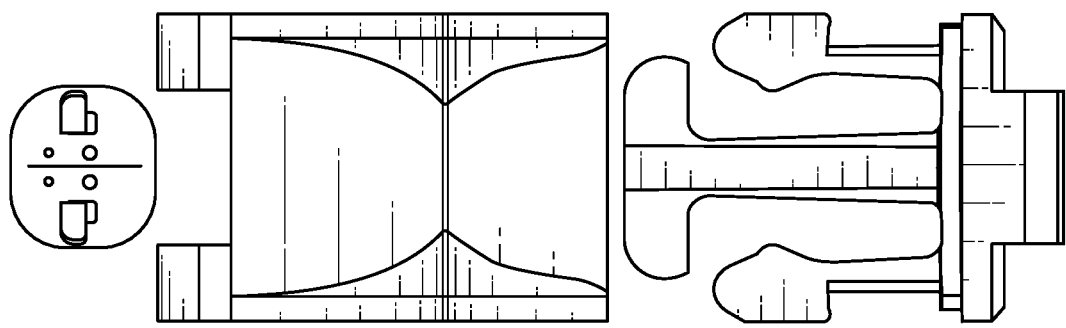
Figure 1J:
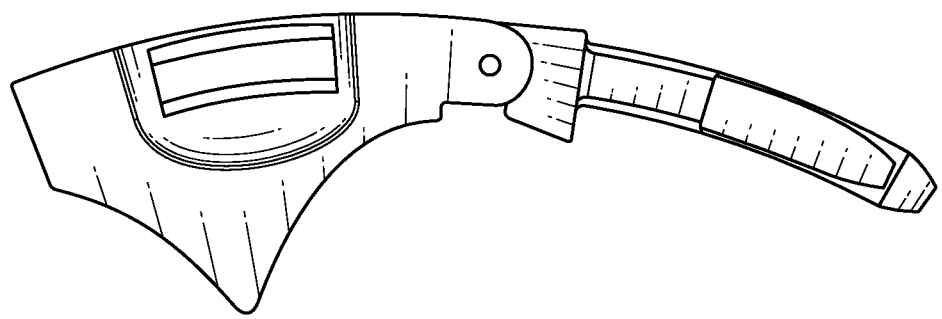
Figure 1K:
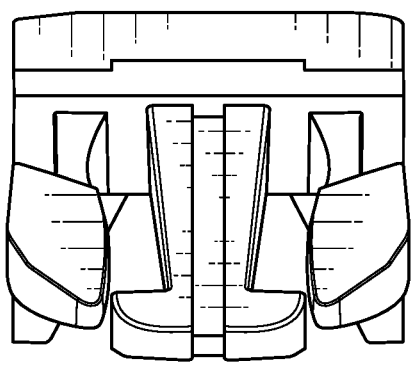
Figure 1L:
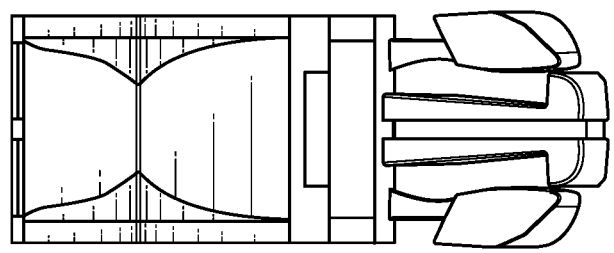
Figure 1M:
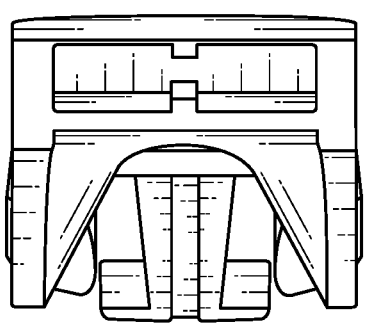
Figure 1N:
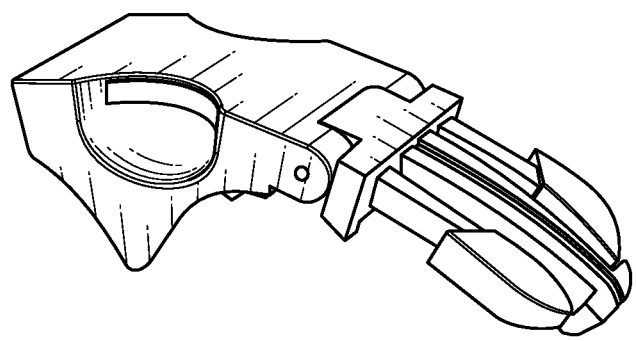

Additional views of embodiments of a collar component of the disclosure are provided in FIGS. 1G-1N. FIG. 1G shows a top view of a collar component of the disclosure. FIG. 1H shows a right side view of a collar component of the disclosure. The left side view is substantially the same as the right side view. FIG. 1I shows a bottom view of a collar component of the disclosure. The left side view is substantially the same as the right side view. FIG. 1J shows a right side view of a collar component of the disclosure. FIG. 1K shows a view from the front of a collar component of the disclosure. FIG. 1L shows a bottom view of a collar component of the disclosure. FIG. 1M shows a rear view of a collar component of the disclosure. FIG. 1N is a perspective view of a collar component of the disclosure.

Figure 2A:
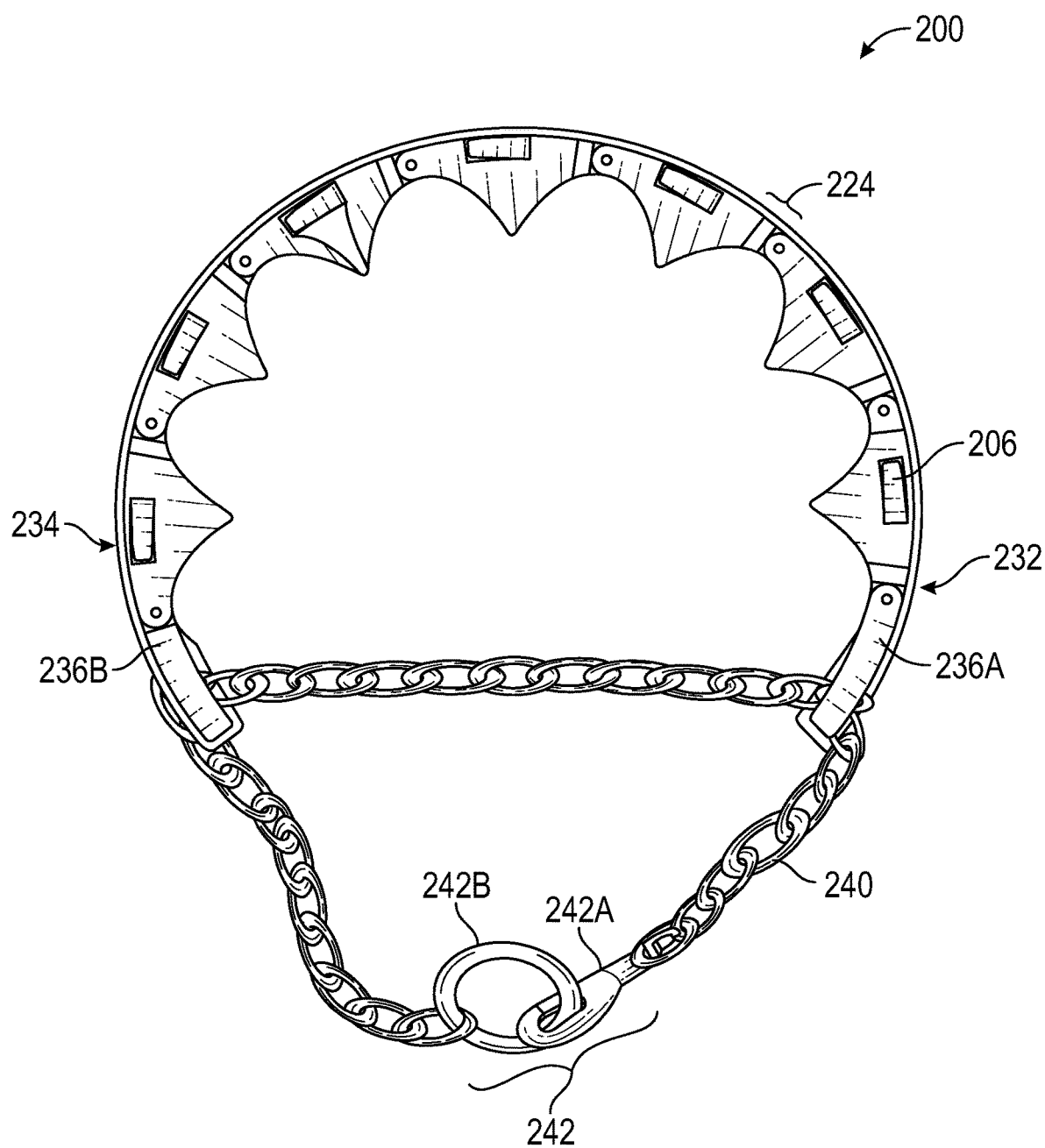
FIGS. 2A-2D show different views of embodiments of collar devices of the disclosure.
Figure 2B:
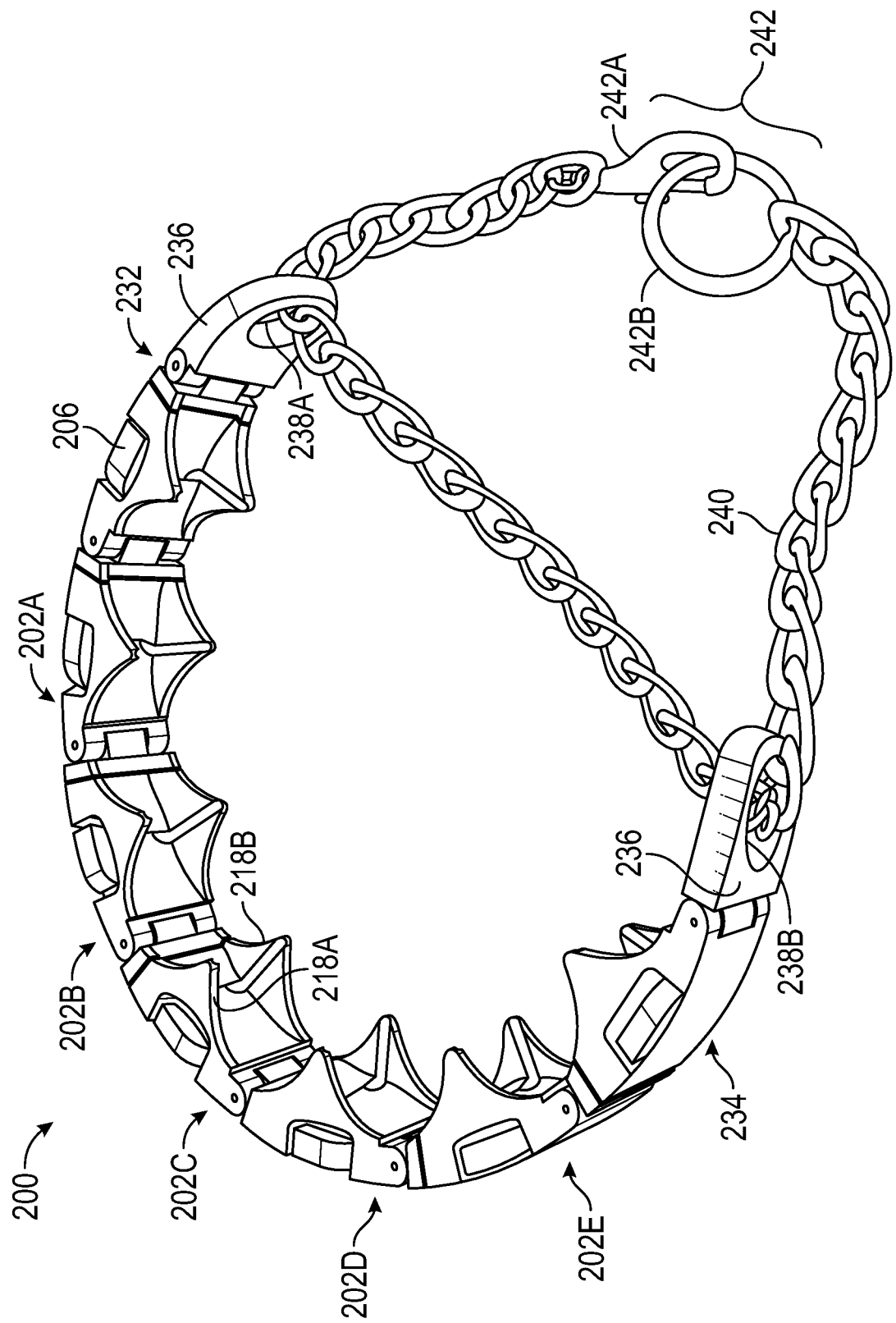

FIG. 2A and FIG. 2B show different views of a collar 200 of the present disclosure formed from a plurality of interlinked collar components. A collar 200 includes a plurality of collar components 202A, 202B, 202C, 202D, 202E, a first loop attachment component 232, and a second loop attachment component 234.

Figure 3A:
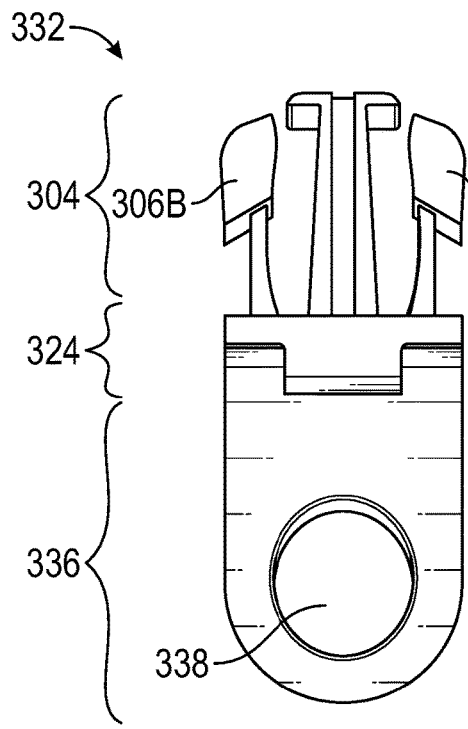
Figure 3B:
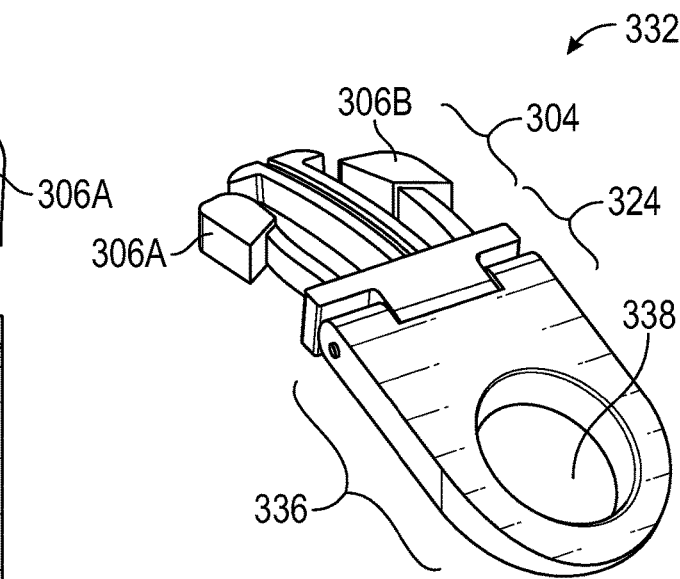

Several views of illustrative first and second loop attachment components 332, 334 are shown in FIGS. 3A-3D. A first loop attachment component 332 includes a loop connection portion 336 at one end, as shown in FIGS. 3A and 3B. A loop connection portion generally has exterior and interior surfaces, and includes an opening 338 that extends through the exterior and interior surfaces. In some embodiments, an opening 338 is substantially round. However, an opening 338 may be formed in any suitable shape.

At the opposite end of a first loop attachment component 332 is a securing portion 304. As described above, a securing portion 304 generally includes one or more locking elements 306A and 306B. In embodiments, locking element(s) are in the form of one or more projections. In some embodiments, a locking element is a single projection. In such embodiments, a locking element may be a center release buckle, a twist lock buckle, a tuck lock buckle, a press lock buckle, a school bag buckle, or the like. In some embodiments, a projection is threaded. In further embodiments, a projection is a length of flexible material that can be doubled over, fed through an opening, and fastened (e.g. with a snap, a button, a clasp, etc.).

In other embodiments, locking elements 306A and 306B are matching projections on two sides of a securing portion 304. In such embodiments, the locking elements may function as a portion of a side release buckle. Illustrative locking elements 306A and 306B are shown in FIG. 3A and FIG. 3B.

When a collar component is interlinked with a first loop attachment component 334, a securing portion 304 of first loop attachment component 334 is inserted into a hollow portion of collar component.

A loop connection portion 336 and a securing portion 304 may be joined by a flexible portion 324. As shown in FIG. 3A and FIG. 3B, a flexible portion 324 may be a hinge. In other embodiments, a flexible portion 324 is an articulation, a swivel, or a bracket. In further embodiments, as described elsewhere herein, a flexible portion 324 is an area of material that is thinner or otherwise formed to allow for flexibility (e.g., corrugated, perforated, etc.). In still further embodiments, a flexible portion 324 is formed of a material that is more flexible than a loop connection portion 336 or a securing portion 304.

In some embodiments, a loop connection portion 336, a flexible portion 324, and a securing portion 304 are formed of a single contiguous element. In other embodiments, a loop connection portion 336 and a securing portion 304 are formed of two elements. In some such embodiments, a flexible portion 324 joins the loop connection portion 336 and the securing portion 304. In some embodiments, a flexible portion 324 and a loop connection portion 336 are formed as a single element. In some embodiments, a flexible portion 324 and a securing portion 304 are formed as a single element.

Figure 3C:
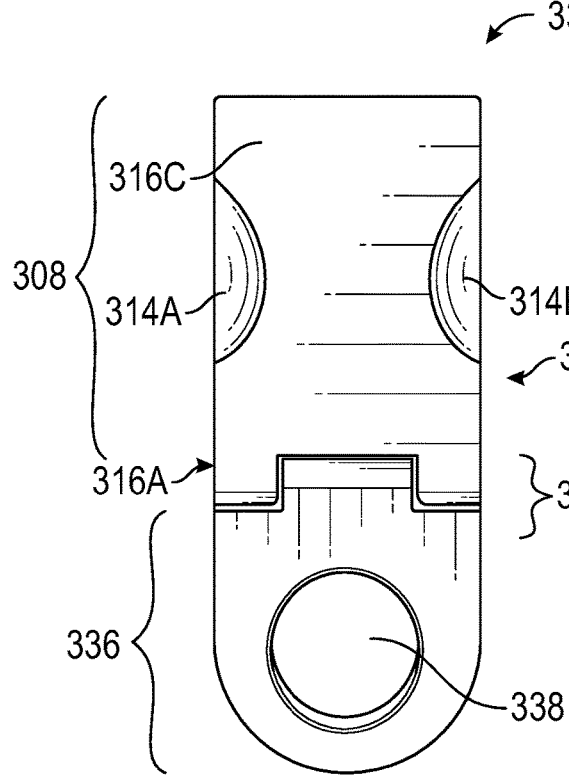
Figure 3D:
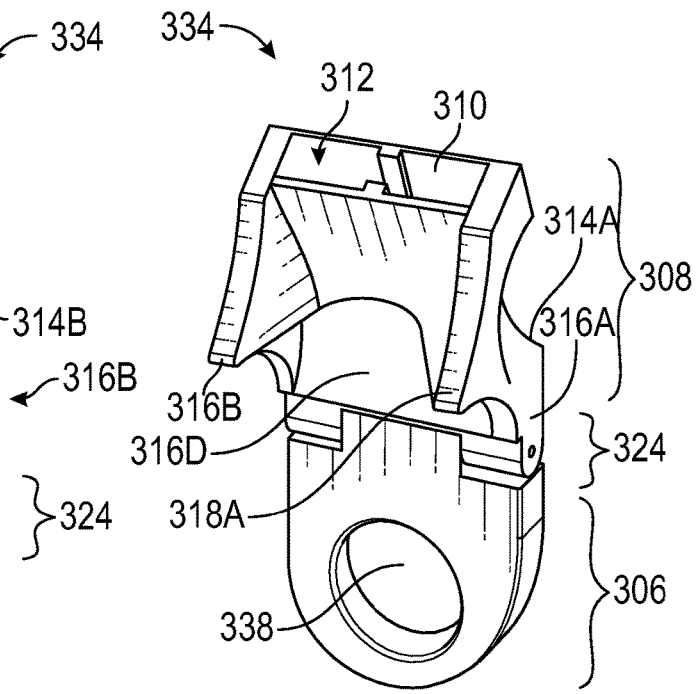

A second loop attachment component 334 includes a loop connection portion 336 at one end, as shown in FIG. 3C and FIG. 3D. A loop connection portion generally has exterior and interior surfaces, and includes an opening 338 that extends through the exterior or interior surfaces. In some embodiments, an opening 338 is substantially round. However, an opening 338 may be formed in any suitable shape.

At the end opposite a loop connection portion 336, a second loop attachment component includes a hollow portion 308 with an opening 310 leading into an interior cavity 312.

When a collar component is interlinked with a second loop attachment component 334, a securing portion of a collar component is inserted into a hollow portion 308 of a second loop attachment component 334.

Accordingly, a hollow portion 308 is generally shaped to receive a securing portion.

A hollow portion 308 may have one or more apertures 314A, 314B. In embodiments, the one or more apertures 314A, 314B correspond to locking elements from a collar element. For example, two apertures 314A, 314B in a hollow portion 308 of a second loop attachment component 334 are shown in FIG. 3C. Such apertures 314A, 314B may correspond to locking elements 106A, 106B of a collar element, such as those shown in FIGS. 1A and 1B. In such embodiments, the one or more apertures 314A, 314B may be in a first surface 316A and second surface 316B.

In embodiments where one locking element is present, one corresponding aperture may be present. In such embodiments, the corresponding aperture may be in one of the exterior or interior surfaces 316C, 316D of a hollow portion 308.

In embodiments, one or more of the exterior or interior surfaces 316C, 316D are substantially planar. In some embodiments, exterior or interior surface 316C, 316D of a hollow portion 308 is arched. In such embodiments, an exterior or interior surface 316C, 316D of a hollow portion 308 may have an angle raging from about 15° to about 45°.

In some embodiments, an exterior or interior surface 316C, 316D of a hollow portion 308 has an angle raging from about 20° to about 40°. In further embodiments, an exterior or interior surface 316C, 316D of a hollow portion 308 may have an angle raging from about 25° to about 35°. In particular embodiments, an exterior or interior surface 316C, 316D of a hollow portion 108 has an angle of about 30°.

In embodiments, an exterior or interior surface 316D of a hollow portion 308 has one or more protrusions 318A, 318B. A protrusion may be located in any suitable location on an exterior or interior surface 316D of a hollow portion 108. In embodiments, a protrusion 318A, 318B is located near either edge of interior surface 116D, as shown in FIG. 3D. In some embodiments, a protrusion is located near an aperture 314A, 314B. In other embodiments, a protrusion is located substantially in the center of an exterior or interior surface 316D.

In some embodiments, a loop attachment component may have one protrusion. In some embodiments, a loop attachment component may have two or more protrusions. In further embodiments, a loop attachment component may have three, four, five, six, or more protrusions.

Such protrusion(s) may be in any suitable shape as described above. In embodiments, a protrusion is a substantially flat triangular protrusion, a substantially conical protrusion, a truncated substantially conical protrusion, a substantially pyramidal (e.g. square-based pyramid, triangle-based pyramid, etc.) protrusion, a truncated substantially conical protrusion, a T-shaped protrusion, an H-shaped protrusion, a U-shaped protrusion, and the like.

Additionally, a protrusion may be any suitable length and width. In some embodiments, the length and width of a protrusion is based on the type of animal on which the collar device will be used. In embodiments, the animal is a canine, and the length and width of a protrusion is chosen based on the breed, age, weight, overall health, and the like. In some embodiments, the length or thickness of a canine's fur may influence the length or width of protrusions used in order to account for the insulating effects of the canine's fur. For example, a collar to be used on a canine with longer or thicker fur may have longer or thinner protrusions than a collar to be used on a canine with little to no fur.

In embodiments, an extension may be present, such as the extension shown in FIG. 1C, as described above. Such an extension 120 may be used if the canine that will wear the collar has particularly thick fur. In some embodiments, an extension 120 is coupled to interior surface 116D or the one or more protrusions 118A, 118B. In some embodiments, the extension 120 is removably coupled. As shown in FIG. 1D, an extension 120 may be in the form of a substantially U-shaped bracket. Such a U-shaped bracket 120 may be situated in a similarly shaped track 122. In such embodiments, the extension 120 may be held in place by pressure exerted by the extension 120 against the sidewalls of protrusions 118A, 118B. In other embodiments, one or more extension are present in any suitable shape.

In embodiments, a protrusion is angled. In some embodiments, a protrusion has an angle ranging from about 15° to about 135°, in relation to surface 116D. In further embodiments, a protrusion has an angle ranging from about 15° to about 60°, from about 30° to about 75°, from about 45° to about 90°, from about 60° to about 105°, from about 75° to about 120°, from about 90° to about 135°, from about 105° to about 150°, or from about 120° to about 165°, in relation to surface 116D. By angling a protrusion, more surface area of the protrusion is engaged as the pressure is increased and the protrusion is pressed into the neck of an animal. Accordingly, as the pressure applied to the lead increases, the impact on the animal increases to a certain point and then plateaus. By distributing the increased pressure over a larger surface area, the risk of causing harm by the collar is reduced.

A loop connection portion 336 and a hollow portion 308 are joined by a flexible portion 324. As shown in FIG. 3C and FIG. 3D, a flexible portion 324 may be a hinge. In other embodiments, a flexible portion 324 is an articulation, a swivel, or a bracket. In further embodiments, a flexible portion 324 is an area of material that is thinner or otherwise formed to allow for flexibility (e.g., corrugated, perforated, etc.). In still further embodiments, a flexible portion 324 is formed of a material that is more flexible than the hollow portion 308 or the securing portion 304.

In some embodiments, a hollow portion 308, a flexible portion 324, and a loop connection portion 336 are formed of a single contiguous element. In other embodiments, a hollow portion 308 and a loop connection portion 336 are formed of two elements. In some such embodiments, a flexible portion 324 joins the hollow portion 308 and the loop connection portion 336. In some embodiments, a flexible portion 324 and a hollow portion 308 are formed as a single element. In some embodiments, a flexible portion 324 and a loop connection portion 336 are formed as a single element.

Additionally, in some embodiments, a locking mechanism is present, such as the locking mechanism 126 shown in FIG. 1E, as described above. Such a locking mechanism may be used to prevent two interlinked collar components from being decoupled. In some embodiments, it is possible to decouple two interlinked collar components while a locking mechanism is engaged, but the locking mechanism hinders efforts to do so. Any suitable locking mechanism may be used. FIG. 1F shows another view of the locking mechanism 126 of FIG. 1E. As can be seen in FIG. 1F, locking mechanism 126 has two prongs 128A, 128B, which may be slid in a track 130 from a first "unlocked" position to a second "locked" position. In such embodiments, when two collar components are interlinked, as discussed further throughout the present application, a locking mechanism 126 may be in engaged (i.e., positioned in a second "locked" position), and prongs 128A, 128B prevent locking elements 106A, 106B (e.g., shown in FIG. 1A) from being pushed toward one another. This may prevent or hinder the decoupling of two collar elements.

Figure 3I:
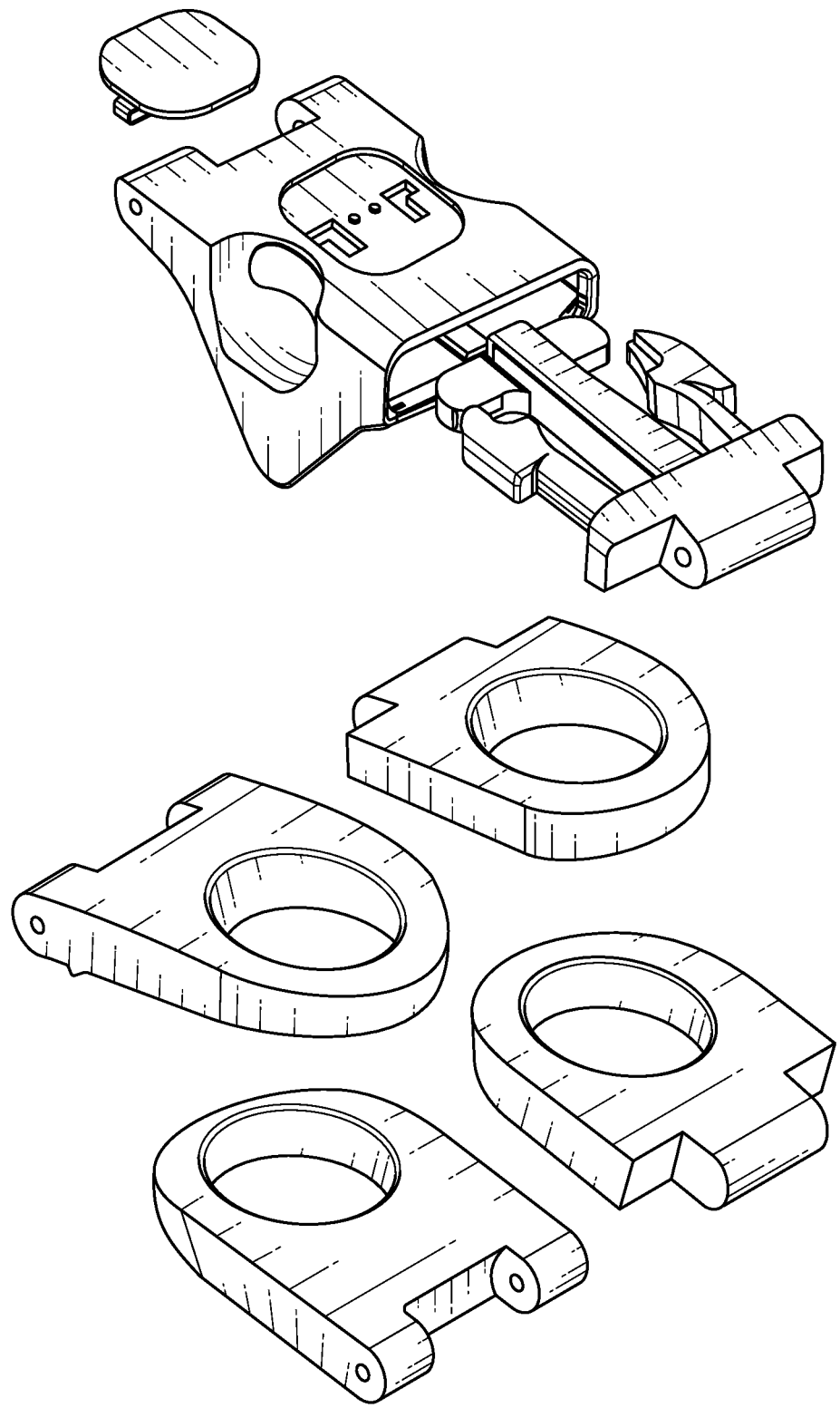

Additional views of embodiments of loop attachment components of the disclosure are shown in FIG. 3E-FIG. 3I. FIG. 3E shows a left side view of a loop attachment component of the disclosure. The right side view is substantially the same as the left side view. FIG. 3F shows a perspective view of a loop attachment component of the disclosure. FIG. 3G shows a perspective view of a loop attachment component of the disclosure. FIG. 3H shows a perspective view of a loop attachment component of the disclosure. FIG. 3I shows exploded views of portions of loop attachment components of the disclosure.

Returning to FIG. 2B, collar 200 is formed by attaching collar components 202A-202E, a first loop attachment component 232, and a second loop attachment component 234. Collar components 202A-202E and loop attachment components 232, 234 can be combined in any suitable order.

In embodiments, collar 200 is formed by attaching a first loop attachment component 232 to a first collar component 202A. A first loop attachment component 232 is attached by inserting a securing portion of a first loop attachment component into a hollow portion of a collar component 202A such that the locking element(s) engage. In FIGS. 2A-2D, for example, a locking element is engaged when the locking element 206 fits into an aperture 214.

A securing portion of a first collar component is inserted into a hollow portion of a second collar component, a securing portion of a second collar component is inserted into a hollow portion of a third collar component, and the like. Once the collar is of an appropriate length, based on a neck circumference of an animal, a second loop attachment component 234 is attached by inserting a securing portion of a collar component 202F into a hollow portion of a second loop attachment component 234.

In some embodiments, a collar 200 may include collar components 202A-202F with a same protrusion pattern. In some embodiments, a collar 200 may include collar components with a first protrusion pattern and collar components with a second protrusion pattern. In further embodiments, a collar 200 may include collar components that have three, four, five, or more protrusion patterns. In some embodiments, a collar 200 may include at least one collar component that does not have a protrusion on the interior surface. Collar components having different protrusion patterns may be combined in any suitable order.

Figure 2C:
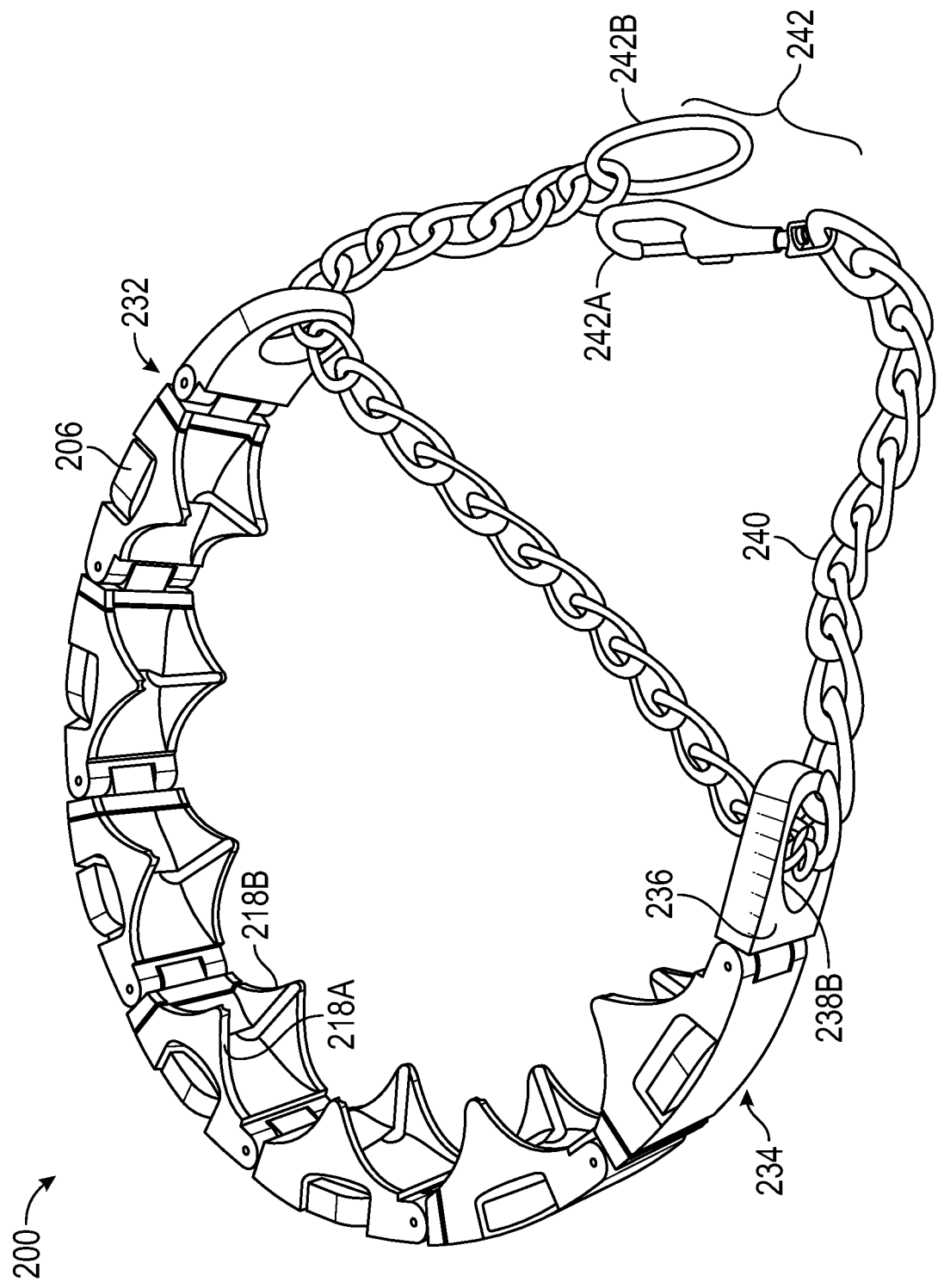
Figure 2D:
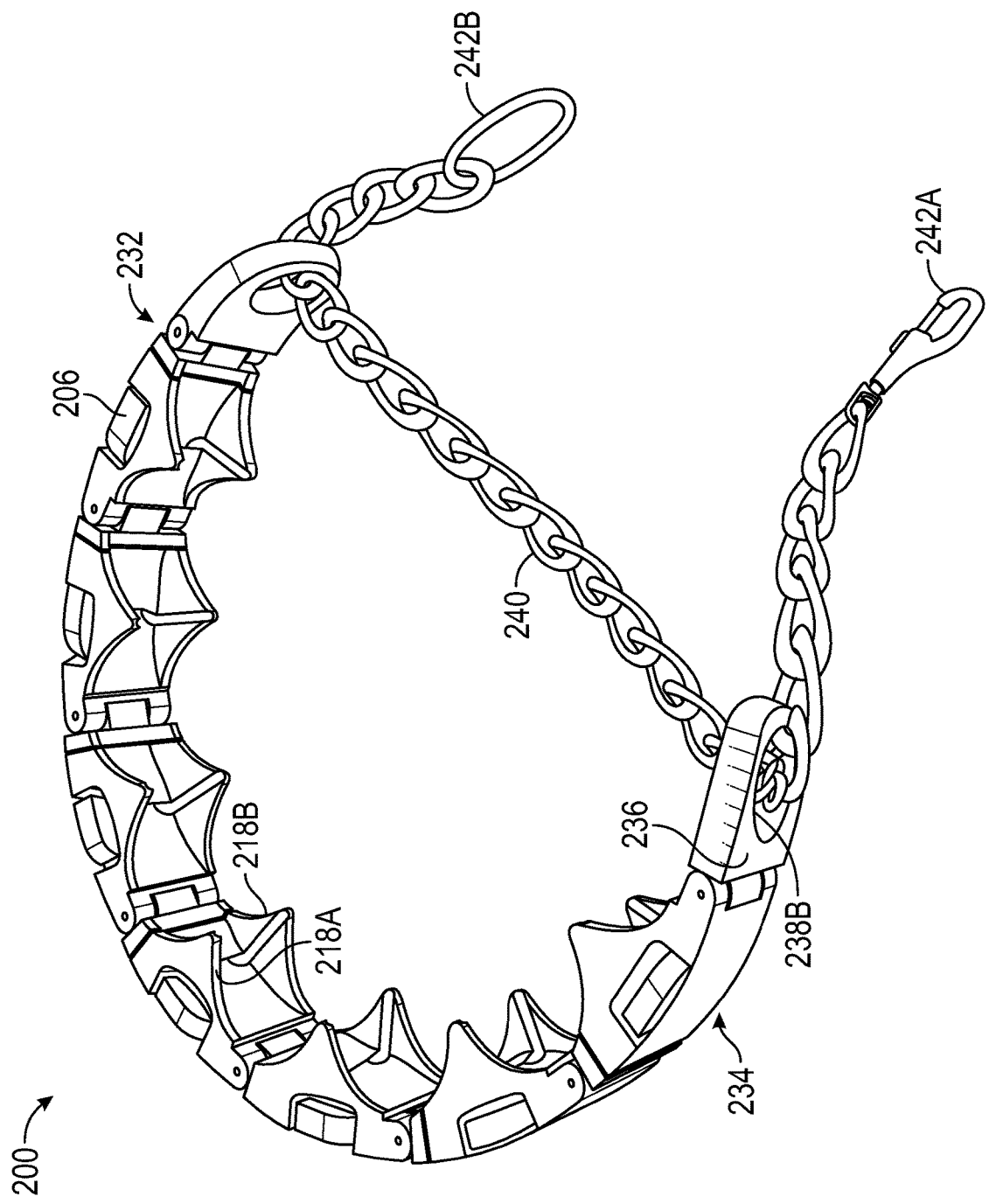

Embodiments of various protrusions 218A, 218B are shown in FIGS. 2C and 2D. In the embodiment of FIG. 2C, protrusions 218A, 218B, are a truncated triangular pyramid shape. For example, in FIG. 2D protrusions 218A, 218B are connected thus forming a single protrusion. In embodiments, a flexible portion 224 used is a hinge, or other articulation. In such embodiments, the articulation of the assembled collar prevents protrusions from rotating away from an animal.

In use, collar components 202A-202F and loop attachment components 232, 234 are interlinked as shown in FIGS. 2A-2D. In some embodiments, a loop 240 is inserted into an opening of a first loop connection portion 236A and an opening of a second loop connection portion 236B of a first loop attachment component 232 and a second loop attachment component 234, respectively. In some embodiments, a loop 240 has been threaded through an opening of a first loop connection portion 236A and an opening of a second loop connection portion 236B of a first loop attachment component 232 and a second loop attachment component 234, respectively prior to assembly of a collar 200. A loop may be made of any suitable material. In some embodiments, a loop is a chain as shown in FIGS. 2A-2C. In other embodiments, a loop is a cord or rope, as shown in FIG. 2D.

In embodiments, a loop 240 has a fastening element 242, which is generally made up of two corresponding portions 242A, 242B. In some embodiments, a fastening element 242 includes a clip 242A and a connector 242B, as illustrated in FIGS. 2A and 2B. A clip 242A may be a carabiner, a butterfly clip, a length of flexible material that can be looped over a ring and fastened (e.g. with a snap, a button, a clasp, etc.), and the like. In some embodiments, a connector 242B is a ring. A ring may be in any suitable shape, such as a circle, an oval, a triangle, a rectangle, and the like. In some embodiments, a fastening element 242 is a buckle (e.g., a side release buckle, a twist lock buckle, a tuck lock buckle, a press lock buckle, a school bag buckle, etc.).

In embodiments, the portions 242A, 242B of a fastening element 242 are larger than openings 238A, 238B in a first or second loop connection portions 236A, 236B. In other words, the openings 238A, 238B are too small for the portions of the fastening element 242A, 242B that connect the ends of the loop to fit through, such that a collar remains in a substantially circular form when the loop 240 is opened. In such embodiments, the collar 200, once assembled, does not completely open and the loop functions similarly to a deployment clasp. This allows for a one-handed application of the collar.

Additionally, by allowing the loop to be opened, as shown in FIG. 2C and FIG. 2D, without the portions of the fastening element 242A, 242B, fitting through openings 238A, 238B the collar may be expanded to a size that allows the collar to be placed over an animal's head. Once put on the animal, by fastening the fastening element (as shown in FIG. 2A and FIG. 2B), the size of the collar may be reduced. While the fastening element is fastened, the skull size of the animal is larger than the circumference of the collar, even if the loop is relaxed, thereby preventing an animal from removing the collar unintentionally (e.g., by backing).

Generally, a loop includes a ring to which a lead can be coupled. In some embodiments, a ring is a portion of a fastening element 242B, as shown in FIG. 2A-2D. In other embodiments, a ring is separate from a fastening element.

In operation, a lead is pulled away from the collar, causing the first and second loop attachment components to move toward each other. Given the shape of the collar components, as discussed above, the force of the first and second loop attachment components being drawn together cause an even pressure on several points around an animal's neck. The shape of the collar components allows the collar to collapse to a fixed position, but no further. This causes points of pressure to be felt by an animal, instead of a band of pressure as is common with other collar designs. Further, this prevents a collar from obstructing an animal's breathing or blood flow, or causing damage to the animal's skin, musculature, skeletal structure, etc. Additionally, the shape of the collar components results in a similar pressure being felt by an animal with more varied force being used by a person using a leash as compared to previous collars.

In additional embodiments, one or more of collar components, first loop attachment components, or second loop attachment components may include auxiliary elements. Examples of auxiliary elements include a GPS transmitter, a flashing light, an identification tag, and the like. Such auxiliary elements may be removably coupled or permanently attached to any of the one or more of collar components, first loop attachment components, or second loop attachment components, in any suitable manner. For example, one or more auxiliary elements may be integrally formed in a collar component, first loop attachment component, or second loop attachment component. In additional embodiments, an identification tag is formed as a cover that fits over surface 116C of a collar component, first loop attachment component, or second loop attachment component.

The present disclosure further includes methods of using a collar device as disclosed herein are provided. Such methods include placing a collar device of the present disclosure over an animal's head and positioning the collar device on the animal's neck, substantially in the middle of their cervical region. In some embodiments, the animal is a canine. In some embodiments, methods of the present disclosure further include unfastening a fastening element, such that the loop is opened prior to placing a collar device over an animal's head. In such embodiments, methods of the present disclosure further include fastening the fastening element after placing a collar device over an animal's head in order to close the loop. In some embodiments, methods include pulling a lead attached to the loop of a collar device of the present disclosure away from the animal, such that the circumference of the collar is decreased.

The present disclosure further includes adapter components. An adapter component is a collar component, first loop attachment component, or second loop attachment component, or portions of one or more such components, that is adapted to be coupled to links from one or more other collar systems (e.g., Sprenger collars, Starmark collars, etc.).

Figure 4C:
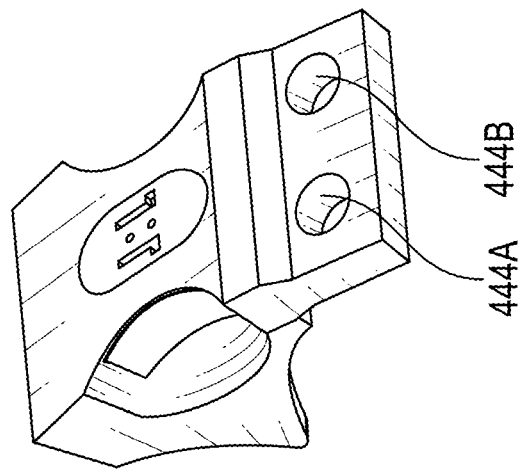
FIGS. 4A-4I show views of several illustrative adapter collar components.
Figure 4B:
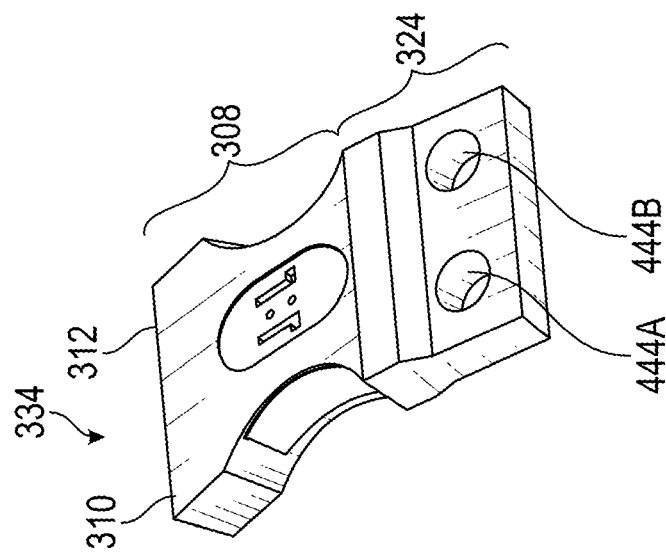
Figure 4A:
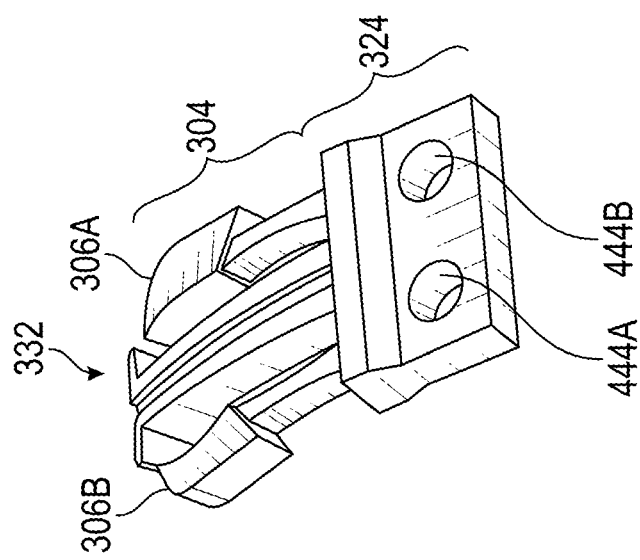
Figure 4F:
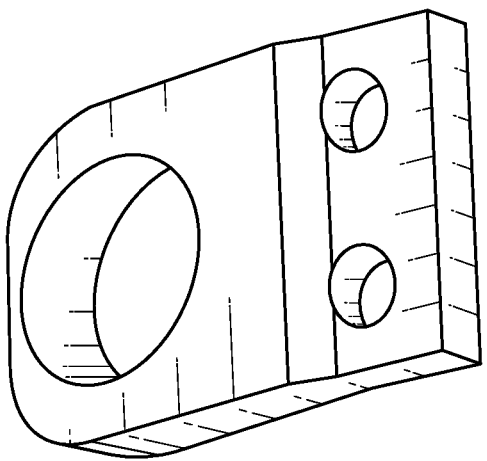
Figure 4E:
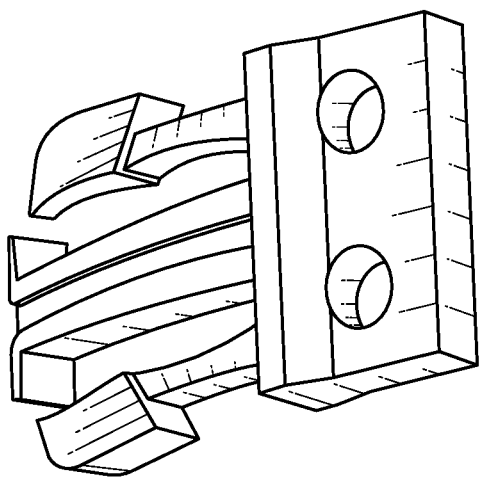

Examples of several adapter components that are designed to couple to Sprenger collar links are shown in FIGS. 4A-4C. In embodiments, the adapter components have two holes 444A and 444B which are positioned to couple with the two corresponding prongs of a Sprenger collar link.

Figure 4G:
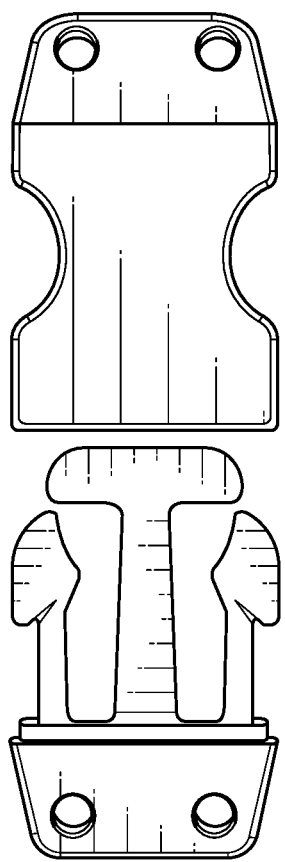
Figure 4D:
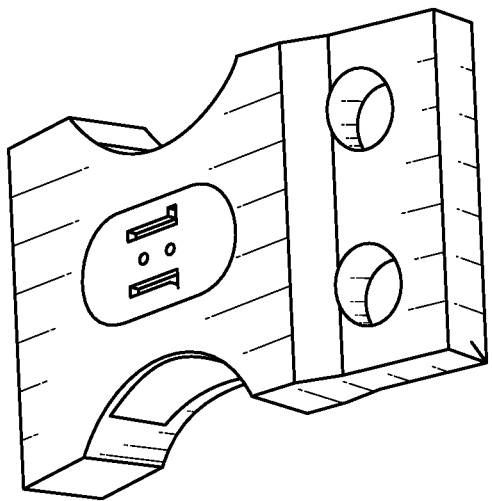
Figure 4I:
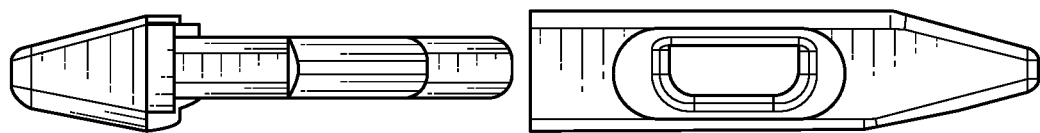
Figure 4H:
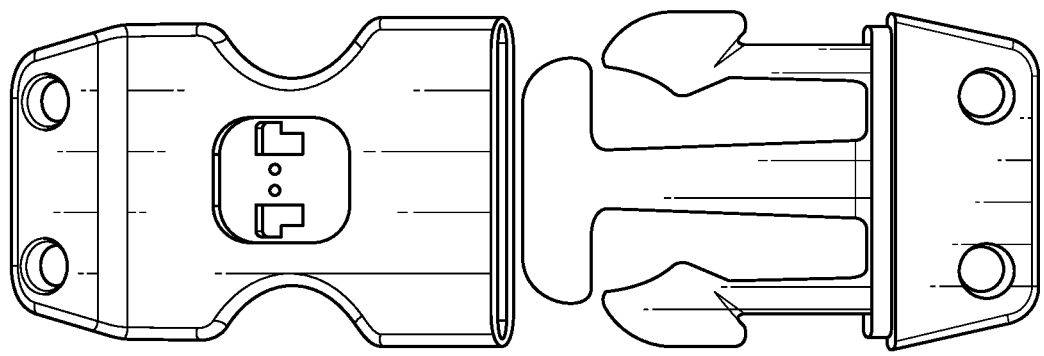

FIG. 4D-4I show various views of embodiments of adapter components of the disclosure. FIGS. 4D-3F show perspective top views of adapter components of the disclosure. FIG. 4G shows a bottom view of an adapter component of the disclosure. FIG. 4H shows a top view of an adapter component of the disclosure. FIG. 4I shows a left side view of an adapter component of the disclosure. The right side view is substantially the same as the left side view.

Figure 5:
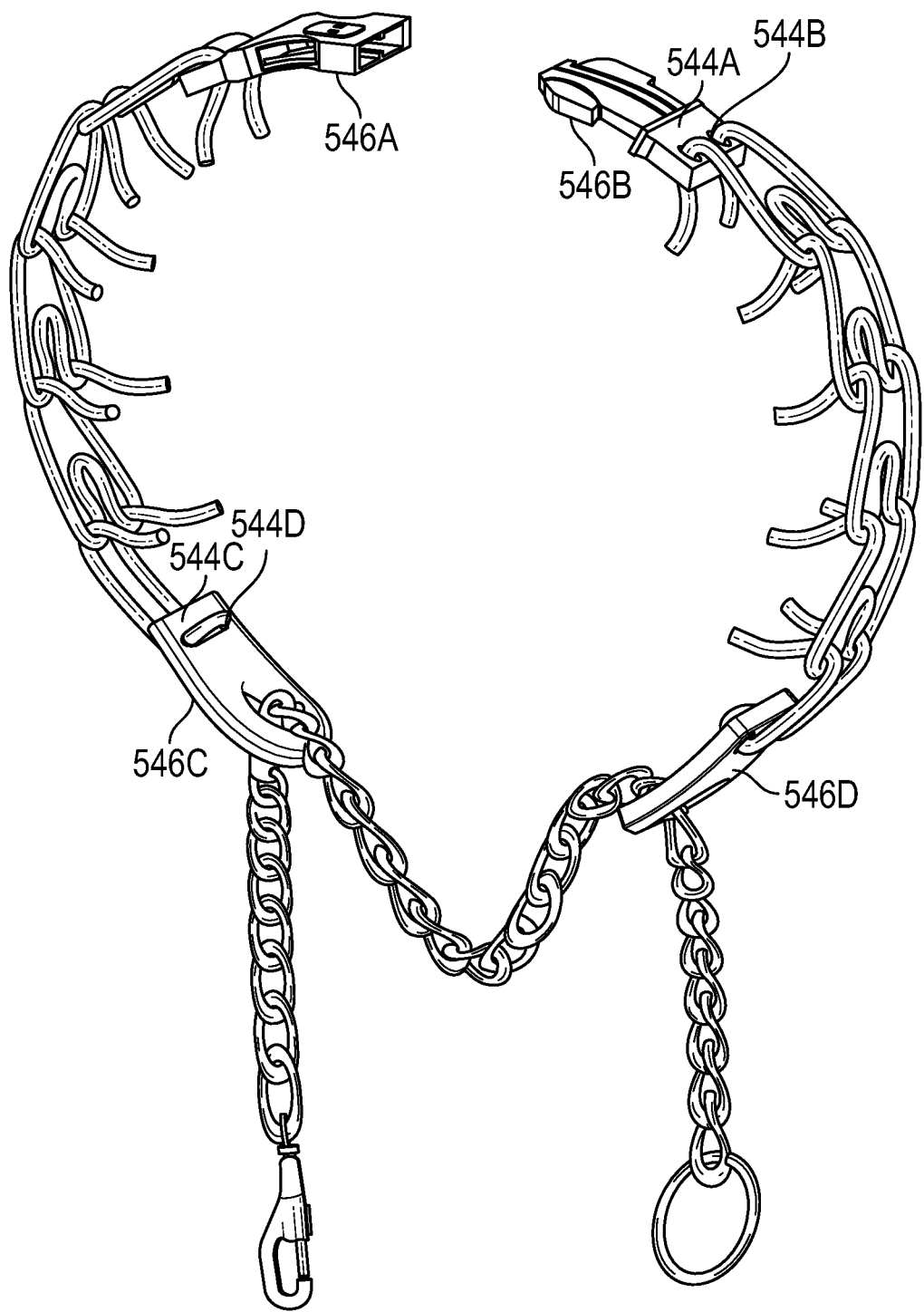
FIG. 5 shows an example of a collar including Sprenger collar links and adapter collar components of the present disclosure.

FIG. 5 shows an illustrative collar including adapter components and Sprenger collar links. As can be seen, four adapter components 546A, 546B, 546C, 546D are present. The depicted components each include two holes (e.g., 544A, 544B of adapter component 546B and 544C, 544D of adapter component 546C) through which the prongs of the Sprenger collar links have been inserted.

In some embodiments, a Sprenger link is coupled to an adapter component 546B such that the two prongs extend through holes 544A, 544B. In other embodiments, the prongs of a Sprenger collar link are inserted through holes 544C, 544D, and the Sprenger collar link is further threaded through the holes 544C, 544D of adapter component 546C, such that the prongs are free to be coupled with another Sprenger collar link or adapter component. Any adapter component may be coupled to a collar link in any suitable order, manner, or direction.

Figure 6A:
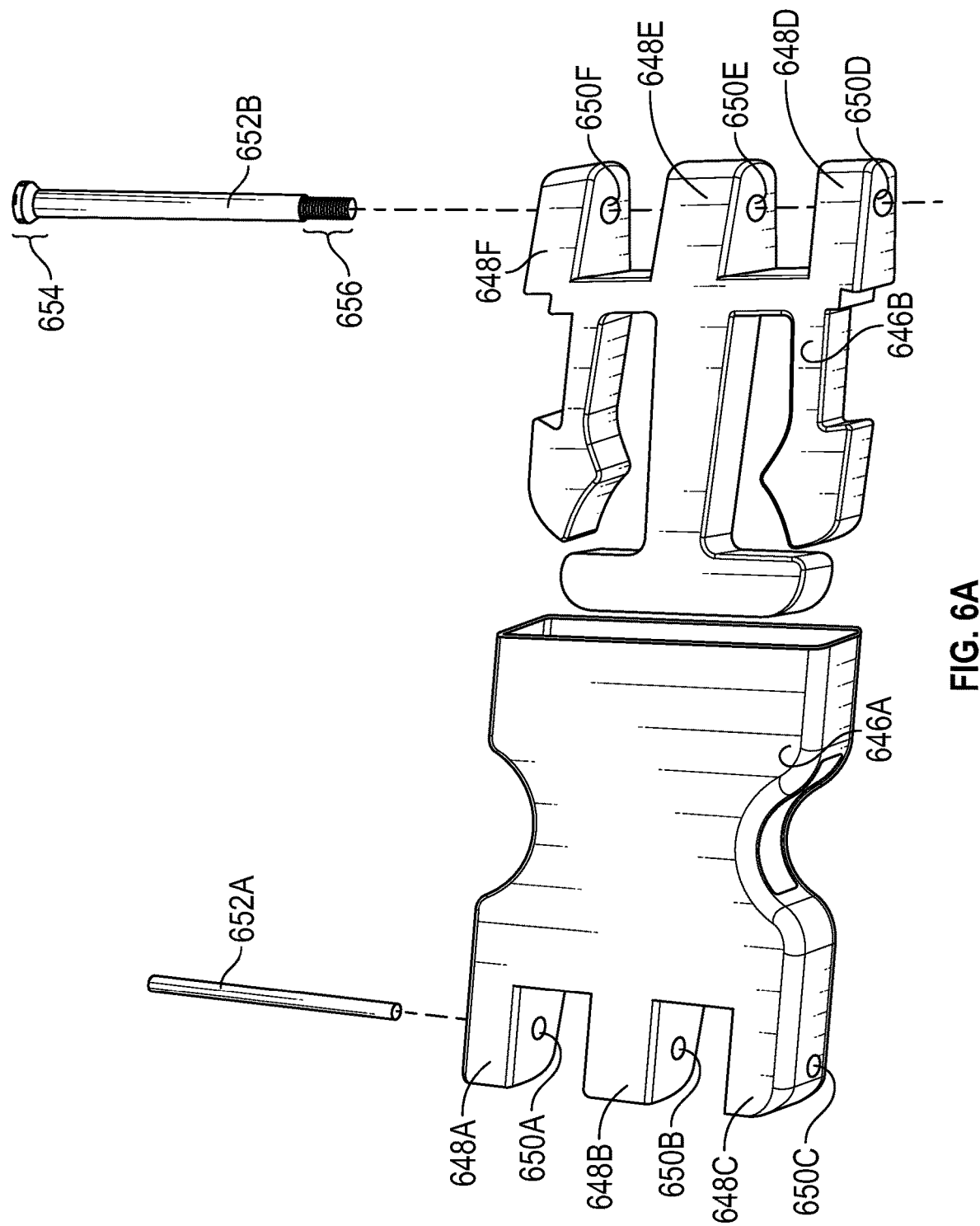
FIGS. 6A-6E show embodiments of adapter collar components of the present disclosure.

Additional embodiments of adapter components of the disclosure are shown in FIG. 6A. Adapter components 646A and 646B each have three projections 648A-648F. The three projections 648A-648C, 648D-648F on each adapter component 646A, 646B has a through hole 650A-650F. The through holes 650A-650C are aligned such that a pin 652A can be positioned through all three through holes at once. Similarly, through holes 650D-650F are aligned such that a pin 652B can be positioned through all three through holes at once.

In embodiments, a pin, such as pin 652B, includes a positioning portion 654 that prevents the pin from passing completely through one or more of holes 650A-650F. In some embodiments, a positioning portion 654 has a larger width (e.g., diameter) than the diameter of one or more through holes 650A-650F. In some embodiments, there is a countersink in an exterior surface of one of the projections (e.g., 648D or 648F) around the through hole (e.g., 650D or 650F, respectively). In such embodiments, the countersink is sized such that the positioning portion can be substantially positioned in the countersink. In some such embodiments, the positioning portion is coplanar with an exterior surface of the projection or recessed into the exterior surface of the projection.

In some embodiments, a positioning portion 654 includes a head to allow a user to securely fasten the pin 652 to the rest of the adapter component 646. In some embodiments, the head is an indentation (e.g., a cross-shaped indentation, a linear indentation, a hexagonal indentation, etc.). In some embodiments, a screw head is a protrusion (e.g., a hexagonal protrusion).

In various embodiments, a pin includes a securing portion 656 that holds the pin in place once positioned. In embodiments, a securing portion includes threading on the exterior surface of the pin. In various embodiments, through holes 650A-650F, or a subset thereof, are threaded. In such embodiments, the exterior surface of the pin, or a portion thereof, may have corresponding threading. For example, pin 652B includes threaded securing portion 656. In some embodiments, at least one of the three through holes is threaded. In some embodiments, at least two of the three through holes are threaded. In some embodiments, the three through holes are threaded.

In some embodiments, securing portion 656 is magnetized. In such embodiments, the corresponding through hole 650 may also be magnetized. For example, the corresponding through hole may be lined with magnetic material.

In embodiments, a Sprenger collar link is positioned in spaces are created when the pin is positioned through the through holes 650A-650C or 650D-650F. Accordingly, in embodiments, the projections 648A-648F and through holes 650A-650F are sized and positioned in order to allow a prong of a Sprenger collar link to be secured in the spaces created. In various embodiments, the projections 648A-648F and through holes 650A-650F are sized and positioned such that the prongs of a Sprenger collar link can be secured therein but cannot be removed without removing the pin.

In any of the above embodiments, an adapter component can include a locking mechanism, as described above.

Figure 6B:
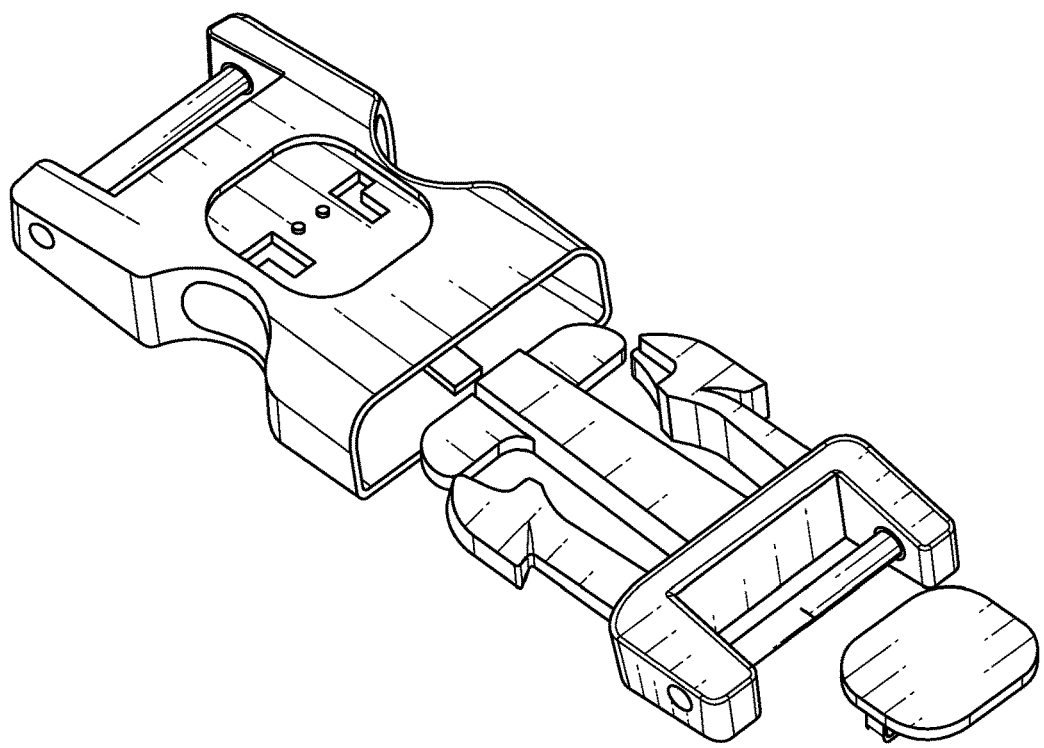
Figure 6C:
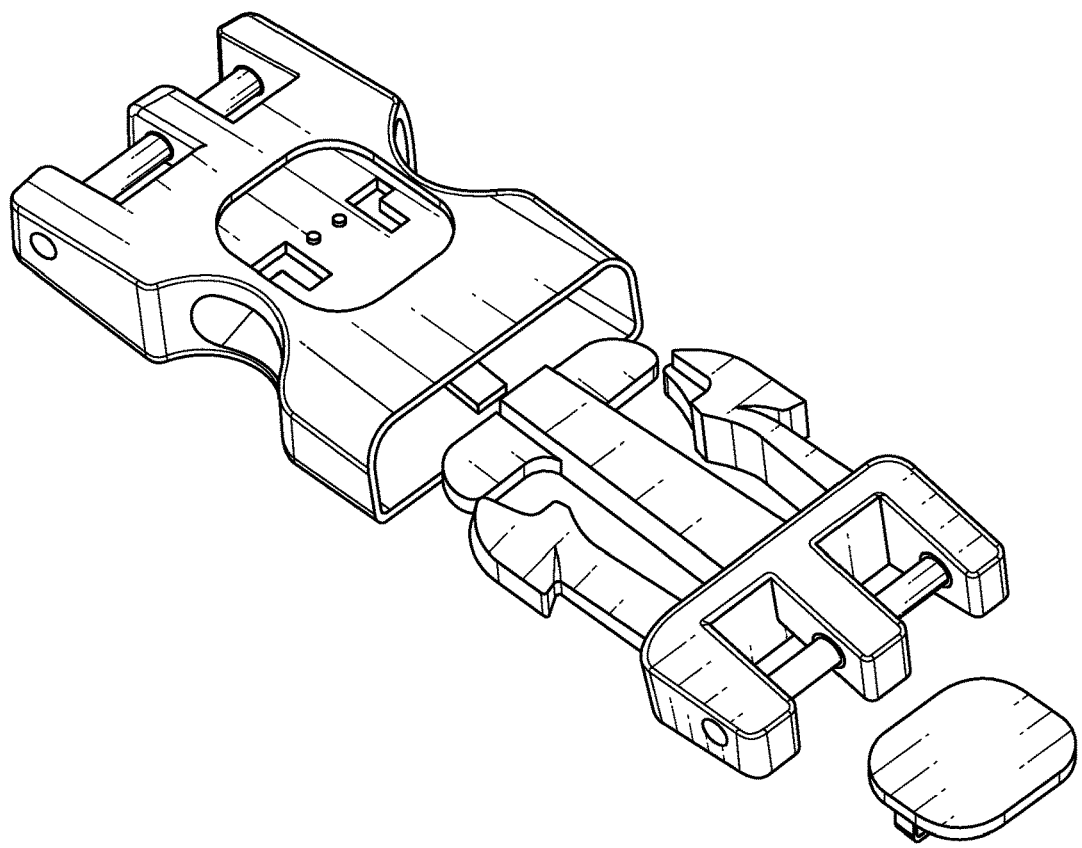
Figure 6D:
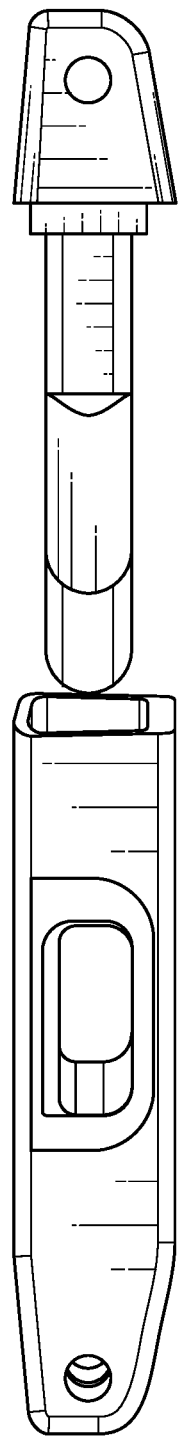
Figure 6E:
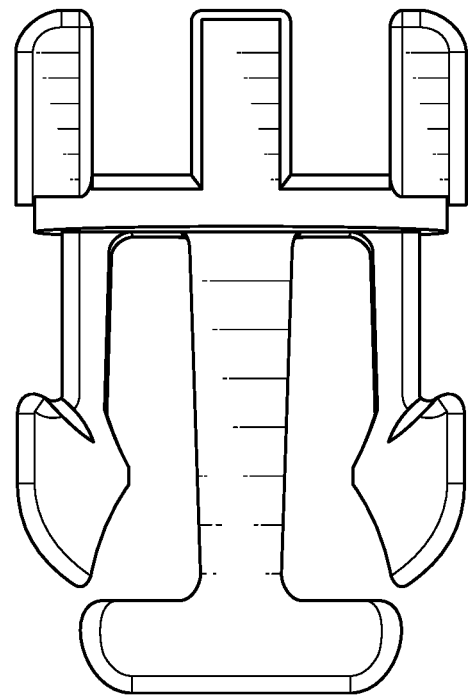
Figure 6E:
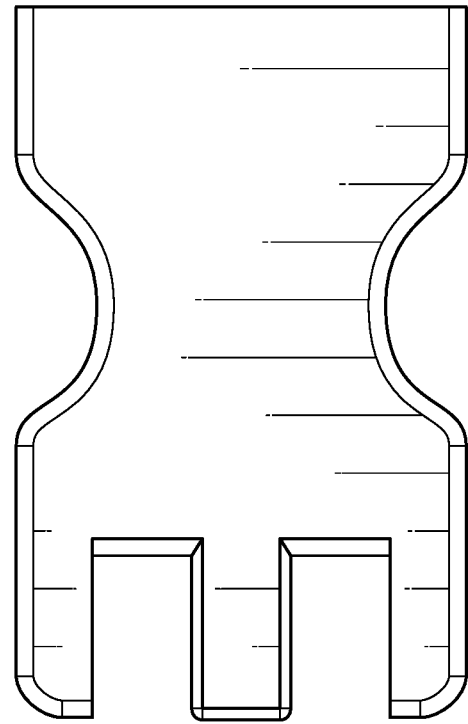

FIGS. 6B-6E show various views of embodiments of adapter components of the disclosure. FIG. 6B shows a perspective view of adapter components of the disclosure. FIG. 6C shows a perspective view of adapter components of the disclosure. FIG. 6D shows a right side view of an adapter component of the disclosure. The right side view is substantially the same as the left side view. FIG. 6E shows a bottom view of an adapter component of the disclosure.

In the preceding description, certain specific details are set forth in order to provide a thorough understanding of various aspects of the disclosed subject matter. However, the disclosed subject matter may be practiced without these specific details. In some instances, well-known structures and methods have not been described in detail to avoid obscuring the descriptions of other aspects of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The terms "a," "an," "the," and similar articles or terms used in the context of describing the disclosure (especially in the context of the following claims) are to be construed to cover both the singular and the plural (i.e., "one or more"), unless otherwise indicated herein or clearly contradicted by context. Ranges of values recited herein are intended to serve as a shorthand method of referring individually to each separate value falling within the range. In the present description, any concentration range, percentage range, ratio range, or integer range is to be understood to include the value of any integer within the recited range and, when appropriate, fractions thereof (such as one tenth and one hundredth of an integer), unless otherwise indicated. Also, any number range recited herein relating to any physical feature, such as size or thickness, are to be understood to include any integer within the recited range, unless otherwise indicated. Unless otherwise indicated herein, each individual value is incorporated into the specification as if it were individually recited herein.

The use of the alternative (e.g., "or") should be understood to mean one, both, or any combination thereof of the alternatives. The various embodiments described above can be combined to provide further embodiments. Groupings of alternative elements or embodiments of the disclosure described herein should not be construed as limitations. Each member of a group may be referred to and claimed individually, or in any combination with other members of the group or other elements found herein.

The term "about" has the meaning reasonably ascribed to it by a person of ordinary skill in the art when used in conjunction with a stated numerical value or range, i.e. denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

The term "substantially" has the meaning reasonably ascribed to it by a person of ordinary skill in the art when used to describe a physical characteristic of an item, i.e., indicating that the item possesses the referenced characteristic to a significant extent, e.g., to within a range of ±20% of the referenced characteristic; ±19% of the referenced characteristic; ±18% of the referenced characteristic; ±17% of the referenced characteristic; ±16% of the referenced characteristic; ±15% of the referenced characteristic; ±14% of the referenced characteristic; ±13% of the referenced characteristic; ±12% of the referenced characteristic; ±11% of the referenced characteristic; ±10% of the referenced characteristic; ±9% of the referenced characteristic; ±8% of the referenced characteristic; ±7% of the referenced characteristic; ±6% of the referenced characteristic; ±5% of the referenced characteristic; ±4% of the referenced characteristic; ±3% of the referenced characteristic; ±2% of the referenced characteristic; or ±1% of the referenced characteristic. For example, an item may be considered substantially circular if any two measurements of a diameter of the item are within a range of ±20%, ±19%; ±18%; ±17%; ±16%; ±15%; ±14%; ±13%; ±12%; ±11%; ±10%; ±9%; ±8%; ±7%; ±6%; ±5%; ±4%; ±3%; ±2%; or ±1% of each other. When used in conjunction with a comparator (e.g., a first coating is substantially thicker than a second coating) substantially is used to mean that the difference is at least ±20% of the referenced characteristic; ±19% of the referenced characteristic; ±18% of the referenced characteristic; ±17% of the referenced characteristic; ±16% of the referenced characteristic; ±15% of the referenced characteristic; ±14% of the referenced characteristic; ±13% of the referenced characteristic; ±12% of the referenced characteristic; ±11% of the referenced characteristic; ±10% of the referenced characteristic; ±9% of the referenced characteristic; ±8% of the referenced characteristic; ±7% of the referenced characteristic; ±6% of the referenced characteristic; ±5% of the referenced characteristic; ±4% of the referenced characteristic; ±3% of the referenced characteristic; ±2% of the referenced characteristic; or ±1% of the referenced characteristic.

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure. The particulars described herein are by way of example and are only for purposes of illustrative discussion of embodiments of the present disclosure. The use of any and all examples, or exemplary language (e.g., "such as") provided herein is merely intended to better illuminate the disclosure and does not pose a limitation on the scope of the disclosure as claimed. No language in the specification should be construed as indicating any non-claimed element is essential to the practice of the disclosure. Further, all methods described herein can be performed in any suitable order unless otherwise indicated herein or otherwise clearly contradicted by context.

Each embodiment disclosed herein can comprise, consist essentially of, or consist of a particular stated element, step, ingredient, or component. The term "comprise" or "comprises" means "includes, but is not limited to," and allows for the inclusion of unspecified elements, steps, ingredients, or components, even in major amounts. The phrase "consisting of" excludes any element, step, ingredient, or component that is not specified. The phrase "consisting essentially of" limits the scope of the embodiment to the specified elements, steps, ingredients, or components, and to those that do not materially affect the basic and novel characteristics of the claimed disclosure.

Definitions used in the present disclosure are meant and intended to be controlling in any future construction unless clearly and unambiguously modified in the examples or when application of the meaning renders any construction meaningless or essentially meaningless. In cases where the construction of the term would render it meaningless or essentially meaningless, the definition should be taken from Webster's Dictionary, 3rd Edition or a dictionary known to those of ordinary skill in the art.

Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

The various embodiments described above can be combined to provide further embodiments. U.S. Provisional Application 62/544,513, filed Aug. 11, 2017 is incorporated herein by reference, in its entirety.

The invention claimed is:

1. A system, comprising:
a first adapter component having a securing portion and a first link attachment portion, the first link attachment portion including two first holes each having a size and a shape for receipt of one prong of a first collar link, the two first holes arranged side by side with the two first holes facing in offset parallel directions;
a second adapter component having a receiving portion and a second link attachment portion, the receiving portion configured to connect with the securing portion of the first adapter component to couple the first adapter component to the second adapter component, and the second link attachment portion of the second adapter component including two second holes for receipt of prongs of a second collar link, the two second holes arranged side by side with the two second holes facing in offset parallel directions.

2. The system of claim 1, wherein the securing portion of the first adapter component includes at least one projection and the receiving portion of the second adapter includes a receiving area configured to connect to the at least one projection of the first adapter component.

3. The system of claim 1, wherein the securing portion of the first adapter component includes two projections and the receiving portion of the second adapter includes a first receiving area, the first receiving area configured to secureably connect with the two projections of the first adapter component.

4. The system of claim 3, wherein the receiving portion further includes a second receiving area on opposite sides of the receiving portion from the first receiving area, a portion of each of the projections received in a corresponding one of the first and second receiving areas in response to the first adapter component being coupled to the second adapter component.

5. The system of claim 3, wherein the projections have a first length and the first link attachment portion of the first adapter component has a second length less than the first length.

6. The system of claim 1, wherein each of the first holes are positioned closer to an outer edge of the first link attachment portion of the first adapter component than to each other.

7. The device of claim 1, wherein the two second holes are arranged side by side in a lateral direction.

8. The device of claim 1, wherein the two second holes each have a size and a shape configured to receive only one prong of the second collar link.

9. A system, comprising:
a first adapter component having a locking portion and a first link attachment portion, the first link attachment portion including two first holes each having a size and a shape for receipt of one prong of a first collar link, the two first holes arranged side by side with the two first holes facing in offset parallel directions;
a second adapter component having a corresponding lock portion and a second link attachment portion, the corresponding lock portion configured to connect with the locking portion of the first adapter component to couple the first adapter component to the second adapter component, and the second link attachment portion of the second adapter component including two second holes for receipt of prongs of a second collar link, the two second holes arranged side by side with the two second holes facing in offset parallel directions.

10. The system of claim 9, wherein the locking portion of the first adapter component includes at least one projection and the corresponding lock portion of the second adapter includes a corresponding area configured to connect to the at least one projection of the first adapter component.

11. The system of claim 9, wherein the locking portion of the first adapter component includes two projections and the corresponding lock portion of the second adapter includes a first corresponding area, the first corresponding area configured to secureably connect with the two projections of the first adapter component.

12. The system of claim 11, wherein the corresponding lock portion further includes a second corresponding area on opposite sides of the corresponding lock portion from the first corresponding area, a portion of each of the projections received in a corresponding one of the first and second corresponding areas in response to the first adapter component being coupled to the second adapter component.

13. The system of claim 11, wherein the projections have a first length and the first link attachment portion of the first adapter component has a second length less than the first length.

14. The system of claim 9, wherein each of the first holes are positioned closer to an outer edge of the first link attachment portion of the first adapter component than to each other.

15. The device of claim 9, wherein the two second holes are arranged side by side in a lateral direction.

16. The device of claim 9, wherein the two second holes each have a size and a shape configured to receive only one prong of the second collar link.

17. A system, comprising:
a first adapter component having one or more locking elements and a first link attachment portion, the first link attachment portion including two first holes each having a size and a shape for receipt of one prong of a first collar link, the two first holes arranged side by side with the two first holes facing in offset parallel directions;
a second adapter component having one or more lock receiving elements and a second link attachment portion, the one or more lock receiving elements configured to connect with the one or more locking elements of the first adapter component to couple the first adapter component to the second adapter component, and the second link attachment portion of the second adapter component including two second holes for receipt of prongs of a second collar link, the two second holes arranged side by side with the two second holes facing in offset parallel directions.

18. The system of claim 17, wherein each of the first holes are positioned closer to an outer edge of the first link attachment portion of the first adapter component than to each other.

19. The device of claim 17, wherein the two second holes are arranged side by side in a lateral direction.

20. The device of claim 17, wherein the two second holes each have a size and a shape configured to receive only one prong of the second collar link.

\* \* \* \* \*